US008674815B1

(12) United States Patent
Harris et al.

(10) Patent No.: US 8,674,815 B1
(45) Date of Patent: Mar. 18, 2014

(54) CONFIGURATION METHOD FOR A REMOTE

(75) Inventors: Glen McLean Harris, Auckland (NZ); Justin M. Henry, Mississauga (CA)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 13/567,986

(22) Filed: Aug. 6, 2012

Related U.S. Application Data

(63) Continuation of application No. 13/103,902, filed on May 9, 2011, which is a continuation of application No. 11/267,528, filed on Nov. 3, 2005, now Pat. No. 7,944,370, which is a continuation of application No. 11/199,922, filed on Aug. 8, 2005, now Pat. No. 7,436,319, which is a continuation of application No. 10/839,970, filed on May 5, 2004, now Pat. No. 7,612,685, which is a continuation of application No. 09/804,623, filed on Mar. 12, 2001, now abandoned.

(60) Provisional application No. 60/189,487, filed on Mar. 15, 2000.

(51) Int. Cl.
*G05B 19/05* (2006.01)

(52) U.S. Cl.
USPC ........................................................ 340/12.22

(58) Field of Classification Search
USPC ......................... 341/176, 5.61, 3.1; 340/12.22
See application file for complete search history.

(56) References Cited

U.S. PATENT DOCUMENTS

| | | | |
|---|---|---|---|
| 3,597,531 | A | 8/1971 | De Marinis et al. |
| 3,990,012 | A | 11/1976 | Karnes |
| 4,174,517 | A | 11/1979 | Mandel |
| 4,231,031 | A | 10/1980 | Crowther et al. |
| 4,287,676 | A | 9/1981 | Weinhaus |
| 4,377,870 | A | 3/1983 | Anderson et al. |
| 4,392,022 | A | 7/1983 | Carlson |
| 4,394,691 | A | 7/1983 | Amano et al. |
| 4,475,123 | A | 10/1984 | Dumbauld et al. |
| 4,488,179 | A | 12/1984 | Kruger et al. |

(Continued)

FOREIGN PATENT DOCUMENTS

| | | |
|---|---|---|
| AU | 66267/90 | 4/1992 |
| AU | 200169851 A1 | 1/2002 |

(Continued)

OTHER PUBLICATIONS

Ciarcia, S., "Build a Trainable Infrared Master Controller," *Byte*, 12(3): 113-123 (1987).

(Continued)

*Primary Examiner* — Vernal Brown

(74) *Attorney, Agent, or Firm* — Kilpatrick Townsend & Stockton LLP

(57) ABSTRACT

An online remote control configuration system for efficiently programming a remote control to recognize a plurality of external electronic devices. The online remote control configuration system includes a remote control having a housing, a keypad, and an electronic system for receiving configuration data from a control station is a global computer network (e.g. Internet). The user preferably "samples" one or more signals from a remote control into the electronic system and then uploads the samples to the control station. The control station analyzes the uploaded samples and transmits the appropriate configuration data to properly configure the electronic system. The user may also access a web site of the control station and manually select each of the external electronic devices that the remote control is to operate after which the control station sends the appropriate configuration data to the electronic system.

28 Claims, 16 Drawing Sheets

(56) References Cited

U.S. PATENT DOCUMENTS 4,566,034 A 1/1986 Harger et al.
4,567,512 A 1/1986 Abraham
4,592,546 A 6/1986 Fascenda et al.
4,623,887 A 11/1986 Welles, II
4,626,848 A 12/1986 Ehlers
4,703,359 A 10/1987 Rumboldt et al.
4,706,121 A 11/1987 Young
4,712,105 A 12/1987 Kohler
4,728,949 A 3/1988 Platte et al.
4,746,919 A 5/1988 Reitmeier
4,774,511 A 9/1988 Rumbolt et al.
4,792,972 A 12/1988 Cook, Jr.
4,807,031 A 2/1989 Broughton et al.
4,825,200 A 4/1989 Evans et al.
4,825,209 A 4/1989 Sasaki et al.
4,837,627 A 6/1989 Mengel
4,845,491 A 7/1989 Fascenda et al.
4,857,898 A 8/1989 Smith
4,866,434 A 9/1989 Keenan
4,876,592 A 10/1989 Von Kohorn
4,888,709 A 12/1989 Revesz et al.
4,899,370 A 2/1990 Kameo et al.
4,918,439 A 4/1990 Wozniak et al.
4,941,090 A 7/1990 McCarthy
4,959,719 A 9/1990 Strubbe et al.
4,959,810 A 9/1990 Darbee et al.
RE33,369 E 10/1990 Hashimoto
4,962,466 A 10/1990 Revesz et al.
4,989,081 A 1/1991 Miyagawa et al.
4,999,622 A 3/1991 Amano et al.
5,001,554 A 3/1991 Johnson et al.
5,016,272 A 5/1991 Stubbs et al.
5,033,079 A 7/1991 Catron et al.
5,046,093 A 9/1991 Wachob
5,065,235 A 11/1991 Iijima
5,065,251 A 11/1991 Shuhart, Jr. et al.
5,089,885 A 2/1992 Clark
5,097,249 A 3/1992 Yamamoto
5,109,222 A 4/1992 Welty
5,115,236 A 5/1992 Kohler
5,117,355 A 5/1992 McCarthy
5,128,752 A 7/1992 Von Kohorn
5,132,679 A 7/1992 Kubo et al.
5,140,326 A 8/1992 Bacrania et al.
5,151,789 A 9/1992 Young
5,161,023 A 11/1992 Keenan
5,177,461 A 1/1993 Budzyna
5,202,826 A 4/1993 McCarthy
5,204,768 A 4/1993 Tsakiris et al.
5,206,722 A 4/1993 Kwan
5,220,420 A 6/1993 Hoarty et al.
5,228,077 A 7/1993 Darbee
5,237,327 A 8/1993 Saitoh et al.
5,249,044 A 9/1993 Von Kohorn
5,251,048 A 10/1993 Doane et al.
5,255,313 A 10/1993 Darbee
5,272,418 A 12/1993 Howe et al.
5,282,028 A 1/1994 Johnson et al.
5,285,278 A 2/1994 Holman
5,287,181 A 2/1994 Holman
5,287,268 A 2/1994 McCarthy
5,297,204 A 3/1994 Levine
5,341,166 A 8/1994 Garr et al.
5,353,121 A 10/1994 Young et al.
5,355,480 A 10/1994 Smith et al.
5,367,316 A 11/1994 Ikezaki
5,374,999 A 12/1994 Chuang et al.
5,381,991 A 1/1995 Stocker
5,382,947 A 1/1995 Thaler et al.
5,404,393 A 4/1995 Remillard
5,406,558 A 4/1995 Rovira et al.
5,410,326 A 4/1995 Goldstein
5,414,426 A 5/1995 O'Donnell et al.
5,414,761 A 5/1995 Darbee
5,416,535 A 5/1995 Sato et al.
5,418,424 A 5/1995 Aprile et al.
5,422,783 A 6/1995 Darbee et al.
5,446,551 A 8/1995 Kawaguchi et al.
5,450,079 A 9/1995 Dunaway
5,455,570 A 10/1995 Cook et al.
5,461,667 A 10/1995 Remillard
5,479,266 A 12/1995 Young et al.
5,479,268 A 12/1995 Young et al.
5,481,251 A 1/1996 Buys et al.
5,481,256 A 1/1996 Darbee et al.
5,483,276 A 1/1996 Brooks et al.
5,497,185 A 3/1996 Dufresne et al.
5,500,681 A 3/1996 Jones
5,500,794 A 3/1996 Fujita et al.
5,502,504 A 3/1996 Marshall et al.
5,504,475 A 4/1996 Houdou et al.
5,515,052 A 5/1996 Darbee
5,515,058 A 5/1996 Chaney et al.
5,515,270 A 5/1996 Weinblatt
5,517,254 A 5/1996 Monta et al.
5,523,794 A 6/1996 Mankovitz et al.
5,523,796 A 6/1996 Marshall et al.
5,524,141 A 6/1996 Braun et al.
5,524,195 A 6/1996 Clanton, III et al.
5,528,304 A 6/1996 Cherrick et al.
5,532,689 A 7/1996 Bueno
5,532,732 A 7/1996 Yuen et al.
5,532,754 A 7/1996 Young et al.
5,537,106 A 7/1996 Mitsuhashi
5,537,107 A 7/1996 Funado
5,537,463 A 7/1996 Escobosa et al.
5,539,393 A 7/1996 Barfod
5,552,837 A 9/1996 Mankovitz
5,552,917 A 9/1996 Darbee et al.
5,557,338 A 9/1996 Maze et al.
5,557,721 A 9/1996 Fite et al.
5,559,548 A 9/1996 Davis et al.
5,566,353 A 10/1996 Cho et al.
5,568,367 A 10/1996 Park
5,576,755 A 11/1996 Davis et al.
5,576,768 A 11/1996 Gomikawa
5,579,055 A 11/1996 Hamilton et al.
5,579,221 A 11/1996 Mun
5,583,491 A 12/1996 Kim
5,585,838 A 12/1996 Lawler et al.
5,585,866 A 12/1996 Miller et al.
5,589,892 A 12/1996 Knee et al.
5,592,551 A 1/1997 Lett et al.
5,596,373 A 1/1997 White et al.
5,600,573 A 2/1997 Hendricks et al.
5,603,078 A 2/1997 Henderson et al.
5,604,923 A 2/1997 Wilkus
5,614,906 A 3/1997 Hayes et al.
5,619,196 A 4/1997 Escobosa
5,619,251 A 4/1997 Kuroiwa et al.
5,625,608 A 4/1997 Grewe et al.
5,627,567 A 5/1997 Davidson
5,629,733 A 5/1997 Youman et al.
5,629,868 A 5/1997 Tessier et al.
5,631,652 A 5/1997 Lee
5,638,050 A 6/1997 Sacca et al.
5,638,113 A 6/1997 Lappington et al.
5,646,608 A 7/1997 Shintani
5,650,831 A 7/1997 Farwell
5,663,757 A 9/1997 Morales
5,671,267 A 9/1997 August et al.
5,677,711 A 10/1997 Kuo
5,684,526 A 11/1997 Yoshinobu
5,686,891 A 11/1997 Sacca et al.
5,689,353 A 11/1997 Darbee et al.
5,695,400 A 12/1997 Fennell, Jr. et al.
5,710,601 A 1/1998 Marshall et al.
5,710,605 A 1/1998 Nelson
5,734,838 A 3/1998 Robinson et al.
5,761,601 A 6/1998 Nemirofsky et al.
5,768,680 A 6/1998 Thomas
5,774,172 A 6/1998 Kapell et al.
5,778,256 A 7/1998 Darbee
5,781,894 A 7/1998 Petrecca et al.

(56) References Cited

U.S. PATENT DOCUMENTS

| | | | |
|---|---|---|---|
| 5,786,814 | A | 7/1998 | Moran et al. |
| 5,794,210 | A | 8/1998 | Goldhaber et al. |
| 5,796,832 | A | 8/1998 | Kawan |
| 5,800,268 | A | 9/1998 | Molnick |
| 5,806,065 | A | 9/1998 | Lomet |
| 5,815,086 | A | 9/1998 | Ivie et al. |
| 5,819,034 | A | 10/1998 | Joseph et al. |
| 5,819,294 | A | 10/1998 | Chambers |
| 5,822,123 | A | 10/1998 | Davis et al. |
| 5,828,318 | A | 10/1998 | Cesar et al. |
| 5,828,945 | A | 10/1998 | Klostman |
| 5,850,249 | A | 12/1998 | Massetti et al. |
| 5,855,008 | A | 12/1998 | Goldhaber et al. |
| 5,870,030 | A | 2/1999 | Deluca et al. |
| 5,870,683 | A | 2/1999 | Wells |
| RE36,119 | E | 3/1999 | Kunishima |
| 5,883,680 | A | 3/1999 | Nykerk |
| 5,886,691 | A | 3/1999 | Furuya et al. |
| 5,907,322 | A | 5/1999 | Kelly et al. |
| 5,909,183 | A | 6/1999 | Borgstahl et al. |
| 5,923,016 | A | 7/1999 | Fredregill et al. |
| 5,940,073 | A | 8/1999 | Klosterman et al. |
| 5,943,228 | A | 8/1999 | Kim |
| 5,946,646 | A | 8/1999 | Schena et al. |
| 5,949,351 | A | 9/1999 | Hahm |
| 5,953,144 | A | 9/1999 | Darbee et al. |
| 5,959,751 | A | 9/1999 | Darbee et al. |
| 5,963,145 | A | 10/1999 | Escobosa |
| 6,002,443 | A | 12/1999 | Iggulden |
| 6,002,450 | A | 12/1999 | Darbee et al. |
| 6,008,802 | A | 12/1999 | Iki et al. |
| 6,014,092 | A | 1/2000 | Darbee et al. |
| 6,040,829 | A | 3/2000 | Croy et al. |
| 6,057,872 | A | 5/2000 | Candelore |
| 6,097,309 | A | 8/2000 | Hayes et al. |
| 6,097,441 | A | 8/2000 | Allport |
| 6,097,520 | A | 8/2000 | Kadnier |
| 6,104,334 | A | 8/2000 | Allport |
| 6,127,941 | A | 10/2000 | Van Ryzin et al. |
| 6,130,625 | A | 10/2000 | Harvey |
| 6,130,726 | A | 10/2000 | Darbee et al. |
| 6,133,847 | A | 10/2000 | Yang |
| 6,144,315 | A | 11/2000 | Flick |
| 6,144,375 | A | 11/2000 | Jain et al. |
| 6,147,677 | A | 11/2000 | Escobosa et al. |
| 6,154,204 | A | 11/2000 | Thompson et al. |
| 6,157,319 | A | 12/2000 | Johns et al. |
| 6,169,451 | B1 | 1/2001 | Kim |
| 6,173,330 | B1 | 1/2001 | Guo et al. |
| 6,177,931 | B1 | 1/2001 | Alexander et al. |
| 6,195,033 | B1 | 2/2001 | Darbee et al. |
| 6,198,479 | B1 | 3/2001 | Humpleman et al. |
| 6,198,481 | B1 | 3/2001 | Urano et al. |
| 6,208,341 | B1 | 3/2001 | van Ee et al. |
| 6,211,870 | B1 | 4/2001 | Foster |
| 6,223,348 | B1 | 4/2001 | Hayes et al. |
| 6,225,938 | B1 | 5/2001 | Hayes et al. |
| 6,243,035 | B1 | 6/2001 | Walter et al. |
| 6,255,961 | B1 | 7/2001 | Van Ryzin et al. |
| 6,271,831 | B1 | 8/2001 | Escobosa et al. |
| 6,275,268 | B1 | 8/2001 | Ellis et al. |
| 6,278,499 | B1 | 8/2001 | Darbee |
| 6,288,799 | B1 | 9/2001 | Sekiguchi |
| 6,326,947 | B1 | 12/2001 | Capps et al. |
| 6,330,091 | B1 | 12/2001 | Escobosa et al. |
| 6,369,803 | B2 | 4/2002 | Brisebois et al. |
| 6,374,404 | B1 | 4/2002 | Brotz et al. |
| 6,397,197 | B1 | 5/2002 | Gindlesperger |
| 6,408,435 | B1 | 6/2002 | Sato |
| 6,445,306 | B1 | 9/2002 | Trovato et al. |
| 6,469,633 | B1 | 10/2002 | Wachter |
| 6,483,548 | B1 | 11/2002 | Allport |
| 6,483,906 | B1 | 11/2002 | Iggulden et al. |
| 6,496,135 | B1 | 12/2002 | Darbee |
| 6,504,580 | B1 | 1/2003 | Thompson |
| 6,522,262 | B1 | 2/2003 | Hayes et al. |
| 6,532,592 | B1 | 3/2003 | Shintani et al. |
| 6,538,556 | B1 | 3/2003 | Kawajiri |
| 6,563,430 | B1 | 5/2003 | Kemink et al. |
| 6,567,011 | B1 | 5/2003 | Young et al. |
| 6,567,984 | B1 | 5/2003 | Allport |
| 6,587,067 | B2 | 7/2003 | Darbee et al. |
| 6,628,340 | B1 | 9/2003 | Graczyk et al. |
| 6,629,077 | B1 | 9/2003 | Arling et al. |
| 6,640,144 | B1 | 10/2003 | Huang et al. |
| 6,642,852 | B2 | 11/2003 | Dresti et al. |
| 6,650,247 | B1 | 11/2003 | Hayes |
| 6,657,679 | B2 | 12/2003 | Hayes et al. |
| 6,690,290 | B2 | 2/2004 | Young et al. |
| 6,690,392 | B1 | 2/2004 | Wugoski |
| 6,701,091 | B2 | 3/2004 | Escobosa et al. |
| 6,720,904 | B1 | 4/2004 | Darbee |
| 6,722,984 | B1 | 4/2004 | Sweeney, Jr. et al. |
| 6,724,339 | B2 | 4/2004 | Conway et al. |
| 6,747,591 | B1 | 6/2004 | Lilleness et al. |
| 6,748,248 | B1 | 6/2004 | Pan et al. |
| 6,748,462 | B2 | 6/2004 | Dubil et al. |
| 6,759,967 | B1 | 7/2004 | Staller |
| 6,781,518 | B1 | 8/2004 | Hayes et al. |
| 6,781,638 | B1 | 8/2004 | Hayes |
| 6,784,804 | B1 | 8/2004 | Hayes et al. |
| 6,784,805 | B2 | 8/2004 | Harris et al. |
| 6,785,579 | B2 | 8/2004 | Huang et al. |
| 6,788,241 | B2 | 9/2004 | Arling et al. |
| 6,813,619 | B2 | 11/2004 | Devara |
| 6,826,370 | B2 | 11/2004 | Escobosa et al. |
| 6,828,992 | B1 | 12/2004 | Freeman et al. |
| 6,829,512 | B2 | 12/2004 | Huang et al. |
| 6,829,992 | B2 | 12/2004 | Kobayashi et al. |
| 6,842,653 | B2 | 1/2005 | Weishut et al. |
| 6,847,101 | B2 | 1/2005 | Fjelstad et al. |
| 6,859,197 | B2 | 2/2005 | Klein et al. |
| 6,862,741 | B1 | 3/2005 | Grooters |
| 6,870,463 | B2 | 3/2005 | Dresti et al. |
| 6,874,037 | B1 | 3/2005 | Abram |
| 6,882,299 | B1 | 4/2005 | Allport |
| 6,882,729 | B2 | 4/2005 | Arling et al. |
| 6,885,952 | B1 | 4/2005 | Hayes et al |
| 6,917,302 | B2 | 7/2005 | Lilleness et al. |
| 6,933,833 | B1 | 8/2005 | Darbee |
| 6,938,101 | B2 | 8/2005 | Hayes et al. |
| 6,946,988 | B2 | 9/2005 | Edwards et al. |
| 6,947,101 | B2 | 9/2005 | Arling |
| 6,968,570 | B2 | 11/2005 | Hayes et al. |
| 6,980,150 | B2 | 12/2005 | Conway et al. |
| 7,005,979 | B2 | 2/2006 | Haughawout et al. |
| 7,009,528 | B2 | 3/2006 | Griep |
| 7,010,805 | B2 | 3/2006 | Hayes et al. |
| 7,013,434 | B2 | 3/2006 | Masters et al. |
| RE39,059 | E | 4/2006 | Foster |
| 7,046,161 | B2 | 5/2006 | Hayes |
| 7,079,113 | B1 | 7/2006 | Hayes et al. |
| 7,091,898 | B2 | 8/2006 | Arling et al. |
| 7,093,003 | B2 | 8/2006 | Yuh et al. |
| 7,102,688 | B2 | 9/2006 | Hayes et al. |
| 7,119,710 | B2 | 10/2006 | Hayes et al. |
| 7,126,468 | B2 | 10/2006 | Arling et al. |
| 7,129,995 | B2 | 10/2006 | Arling |
| 7,135,985 | B2 | 11/2006 | Woolgar et al. |
| 7,136,709 | B2 | 11/2006 | Arling et al. |
| 7,142,127 | B2 | 11/2006 | Hayes et al. |
| 7,142,934 | B2 | 11/2006 | Janik |
| 7,142,935 | B2 | 11/2006 | Janik |
| 7,143,214 | B2 | 11/2006 | Hayes et al. |
| 7,151,528 | B2 | 12/2006 | Taylor et al. |
| 7,154,428 | B2 | 12/2006 | de Clercq et al. |
| 7,154,483 | B2 | 12/2006 | Kobayashi |
| 7,155,305 | B2 | 12/2006 | Hayes et al. |
| 7,161,524 | B2 | 1/2007 | Nguyen |
| 7,167,765 | B2 | 1/2007 | Janik |
| 7,167,913 | B2 | 1/2007 | Chambers |
| 7,193,661 | B2 | 3/2007 | Dresti et al. |
| 7,200,357 | B2 | 4/2007 | Janik et al. |
| 7,209,116 | B2 | 4/2007 | Gates et al. |

(56) References Cited

U.S. PATENT DOCUMENTS

| | | | |
|---|---|---|---|
| 7,218,243 | B2 | 5/2007 | Hayes et al. |
| 7,221,306 | B2 | 5/2007 | Young |
| 7,224,903 | B2 | 5/2007 | Colmenarez et al. |
| RE39,716 | E | 7/2007 | Huang et al. |
| 7,253,765 | B2 | 8/2007 | Edwards et al. |
| 7,254,777 | B2 | 8/2007 | Hayes et al. |
| 7,266,701 | B2 | 9/2007 | Hayes et al. |
| 7,266,777 | B2 | 9/2007 | Scott et al. |
| 7,268,694 | B2 | 9/2007 | Hayes et al. |
| 7,274,303 | B2 | 9/2007 | Dresti et al. |
| 7,281,262 | B2 | 10/2007 | Hayes et al. |
| 7,283,059 | B2 | 10/2007 | Harris et al. |
| 7,319,409 | B2 | 1/2008 | Hayes et al. |
| 7,319,426 | B2 | 1/2008 | Garfio |
| 7,436,319 | B1 | 10/2008 | Harris et al. |
| 7,574,693 | B1 | 8/2009 | Kemink |
| 7,590,999 | B2 | 9/2009 | Perlman |
| 7,612,685 | B2 | 11/2009 | Harris et al. |
| 7,746,244 | B2 | 6/2010 | Wouters |
| 7,889,095 | B1 | 2/2011 | Harris et al. |
| 7,944,370 | B1 | 5/2011 | Harris et al. |
| 8,026,789 | B2 | 9/2011 | Harris et al. |
| 8,098,140 | B1 | 1/2012 | Escobosa et al. |
| 2001/0033243 | A1 | 10/2001 | Harris et al. |
| 2002/0008789 | A1 | 1/2002 | Harris et al. |
| 2002/0046083 | A1 | 4/2002 | Ondeck |
| 2002/0056084 | A1 | 5/2002 | Harris et al. |
| 2002/0151327 | A1 | 10/2002 | Levitt |
| 2002/0170073 | A1 | 11/2002 | Miller et al. |
| 2002/0184626 | A1 | 12/2002 | Darbee et al. |
| 2002/0190956 | A1 | 12/2002 | Klein et al. |
| 2002/0194410 | A1 | 12/2002 | Hayes et al. |
| 2003/0046579 | A1 | 3/2003 | Hayes et al. |
| 2003/0048295 | A1 | 3/2003 | Lilleness et al. |
| 2003/0095156 | A1 | 5/2003 | Klein et al. |
| 2003/0103088 | A1 | 6/2003 | Dresti et al. |
| 2003/0117427 | A1 | 6/2003 | Haughawout et al. |
| 2003/0151538 | A1 | 8/2003 | Escobosa et al. |
| 2003/0164773 | A1 | 9/2003 | Young et al. |
| 2003/0164787 | A1 | 9/2003 | Dresti et al. |
| 2003/0189509 | A1 | 10/2003 | Hayes et al. |
| 2003/0193519 | A1 | 10/2003 | Hayes et al. |
| 2003/0233664 | A1 | 12/2003 | Huang et al. |
| 2004/0046677 | A1 | 3/2004 | Dresti et al. |
| 2004/0056789 | A1 | 3/2004 | Arling et al. |
| 2004/0056984 | A1 | 3/2004 | Hayes et al. |
| 2004/0070491 | A1 | 4/2004 | Huang et al. |
| 2004/0093096 | A1 | 5/2004 | Huang et al. |
| 2004/0117632 | A1 | 6/2004 | Arling et al. |
| 2004/0136726 | A1 | 7/2004 | Escobosa et al. |
| 2004/0169590 | A1 | 9/2004 | Haughawout et al. |
| 2004/0169598 | A1 | 9/2004 | Arling et al. |
| 2004/0189508 | A1 | 9/2004 | Nguyen |
| 2004/0189509 | A1 | 9/2004 | Lilleness et al. |
| 2004/0210933 | A1 | 10/2004 | Dresti et al. |
| 2004/0246165 | A1 | 12/2004 | Conway, Jr. et al. |
| 2004/0263349 | A1 | 12/2004 | Haughawout et al. |
| 2004/0266419 | A1 | 12/2004 | Arling et al. |
| 2004/0268391 | A1 | 12/2004 | de Clercq et al. |
| 2005/0024226 | A1 | 2/2005 | Hayes et al. |
| 2005/0030196 | A1 | 2/2005 | Harris et al. |
| 2005/0052423 | A1 | 3/2005 | Harris et al. |
| 2005/0055716 | A1 | 3/2005 | Louie et al. |
| 2005/0062614 | A1 | 3/2005 | Young |
| 2005/0062636 | A1 | 3/2005 | Conway et al. |
| 2005/0066370 | A1 | 3/2005 | Alvarado et al. |
| 2005/0078087 | A1 | 4/2005 | Gates et al. |
| 2005/0080496 | A1 | 4/2005 | Hayes et al. |
| 2005/0088315 | A1 | 4/2005 | Klein et al. |
| 2005/0094610 | A1 | 5/2005 | de Clerq et al. |
| 2005/0096753 | A1 | 5/2005 | Arling et al. |
| 2005/0097594 | A1 | 5/2005 | O'Donnell et al. |
| 2005/0097618 | A1 | 5/2005 | Arling et al. |
| 2005/0107966 | A1 | 5/2005 | Hayes |
| 2005/0116930 | A1 | 6/2005 | Gates |
| 2005/0134578 | A1 | 6/2005 | Chambers et al. |
| 2005/0159823 | A1 | 7/2005 | Hayes et al. |
| 2005/0162282 | A1 | 7/2005 | Dresti et al. |
| 2005/0179559 | A1 | 8/2005 | Edwards et al. |
| 2005/0183104 | A1 | 8/2005 | Edwards et al. |
| 2005/0195979 | A1 | 9/2005 | Arling et al. |
| 2005/0200598 | A1 | 9/2005 | Hayes et al. |
| 2005/0210101 | A1 | 9/2005 | Janik |
| 2005/0216606 | A1 | 9/2005 | Hayes et al. |
| 2005/0216843 | A1 | 9/2005 | Masters et al. |
| 2005/0231649 | A1 | 10/2005 | Arling |
| 2005/0258806 | A1 | 11/2005 | Janik et al. |
| 2005/0280743 | A1 | 12/2005 | Dresti et al. |
| 2005/0283814 | A1 | 12/2005 | Scott et al. |
| 2005/0285750 | A1 | 12/2005 | Hayes et al. |
| 2006/0007306 | A1 | 1/2006 | Masters et al. |
| 2006/0012488 | A1 | 1/2006 | Hilbrink et al. |
| 2006/0031400 | A1 | 2/2006 | Yuh et al. |
| 2006/0031437 | A1 | 2/2006 | Chambers |
| 2006/0031549 | A1 | 2/2006 | Janik et al. |
| 2006/0031550 | A1 | 2/2006 | Janik et al. |
| 2006/0050142 | A1 | 3/2006 | Scott et al. |
| 2006/0055554 | A1 | 3/2006 | Hayes et al. |
| 2006/0101498 | A1 | 5/2006 | Arling et al. |
| 2006/0125800 | A1 | 6/2006 | Janik |
| 2006/0132458 | A1 | 6/2006 | Garfio et al. |
| 2006/0143572 | A1 | 6/2006 | Scott et al. |
| 2006/0150120 | A1 | 7/2006 | Dresti et al. |
| 2006/0161865 | A1 | 7/2006 | Scott et al. |
| 2006/0192855 | A1 | 8/2006 | Harris et al. |
| 2006/0194549 | A1 | 8/2006 | Janik et al. |
| 2006/0200538 | A1 | 9/2006 | Yuh et al. |
| 2006/0259183 | A1 | 11/2006 | Hayes et al. |
| 2006/0259184 | A1 | 11/2006 | Hayes et al. |
| 2006/0259864 | A1 | 11/2006 | Klein et al. |
| 2006/0262002 | A1 | 11/2006 | Nguyen |
| 2006/0283697 | A1 | 12/2006 | Garfio |
| 2006/0288300 | A1 | 12/2006 | Chambers et al. |
| 2006/0294217 | A1 | 12/2006 | Chambers |
| 2007/0037522 | A1 | 2/2007 | Liu et al. |
| 2007/0052547 | A1 | 3/2007 | Haughawout et al. |
| 2007/0061027 | A1 | 3/2007 | Janik |
| 2007/0061028 | A1 | 3/2007 | Janik |
| 2007/0061029 | A1 | 3/2007 | Janik |
| 2007/0063860 | A1 | 3/2007 | Escobosa et al. |
| 2007/0073958 | A1 | 3/2007 | Kalayjian |
| 2007/0077784 | A1 | 4/2007 | Kalayjian et al. |
| 2007/0097275 | A1 | 5/2007 | Dresti et al. |
| 2007/0136693 | A1 | 6/2007 | Lilleness et al. |
| 2007/0156739 | A1 | 7/2007 | Black et al. |
| 2007/0178830 | A1 | 8/2007 | Janik et al. |
| 2007/0206949 | A1 | 9/2007 | Mortensen |
| 2007/0225828 | A1 | 9/2007 | Huang et al. |
| 2007/0233740 | A1 | 10/2007 | Nichols et al. |
| 2007/0258595 | A1 | 11/2007 | Choy |
| 2007/0271267 | A1 | 11/2007 | Lim et al. |
| 2007/0279244 | A1 | 12/2007 | Haughawout et al. |
| 2007/0296552 | A1 | 12/2007 | Huang et al. |
| 2008/0005764 | A1 | 1/2008 | Arling et al. |
| 2008/0016467 | A1 | 1/2008 | Chambers et al. |
| 2008/0016468 | A1 | 1/2008 | Chambers et al. |
| 2008/0036642 | A1 | 2/2008 | Harris et al. |
| 2008/0042982 | A1 | 2/2008 | Gates et al. |
| 2008/0062033 | A1 | 3/2008 | Harris et al. |
| 2008/0062034 | A1 | 3/2008 | Harris et al. |
| 2008/0068247 | A1 | 3/2008 | Harris et al. |
| 2008/0198059 | A1 | 8/2008 | Harris et al. |
| 2008/0302582 | A1 | 12/2008 | Sekhri et al. |
| 2009/0224955 | A1 | 9/2009 | Bates et al. |
| 2010/0033638 | A1 | 2/2010 | O'Donnell |
| 2011/0133976 | A1 | 6/2011 | Harris et al. |
| 2012/0326852 | A1 | 12/2012 | Harris et al. |

FOREIGN PATENT DOCUMENTS

| | | | |
|---|---|---|---|
| CA | 2092003 | A1 | 11/2008 |
| CN | 1399444 | A | 2/2003 |
| CN | 1434422 | A | 8/2003 |
| DE | 19520754 | A1 | 12/1996 |

(56) References Cited

FOREIGN PATENT DOCUMENTS

| | | | |
|---|---|---|---|
| EP | 103 438 | A1 | 3/1984 |
| EP | 0103438 | A1 | 3/1984 |
| EP | 0398 550 | A2 | 11/1990 |
| EP | 0972280 | A1 | 1/2000 |
| EP | 1014577 | A1 | 6/2000 |
| EP | 1198069 | B1 | 4/2002 |
| EP | 1777830 | A1 | 4/2007 |
| FR | 2738931 | A1 | 3/1997 |
| GB | 2081948 | A | 2/1982 |
| GB | 2175724 | A | 12/1986 |
| GB | 2304217 | A | 3/1997 |
| JP | 7075173 | A | 3/1995 |
| JP | 7112301 | B | 11/1995 |
| JP | 2002058079 | A | 2/2002 |
| JP | 2002271871 | A | 9/2002 |
| JP | 2003087881 | A | 3/2003 |
| MX | PA/2003000322 | A | 11/2003 |
| WO | WO 01/69567 | A2 | 9/1991 |
| WO | WO 93/12612 | A1 | 6/1993 |
| WO | WO 93/19427 | A1 | 9/1993 |
| WO | WO 94/15417 | A1 | 7/1994 |
| WO | WO 95/01056 | A1 | 1/1995 |
| WO | WO 95/01057 | A1 | 1/1995 |
| WO | WO 95/01058 | A1 | 1/1995 |
| WO | WO 95/01059 | A1 | 1/1995 |
| WO | WO 95/32563 | A1 | 11/1995 |
| WO | WO 95/32583 | A1 | 11/1995 |
| WO | 9628903 | A1 | 9/1996 |
| WO | WO 96/30864 | A1 | 10/1996 |
| WO | WO 97/33434 | A1 | 9/1997 |
| WO | WO 98/43158 | A | 10/1998 |
| WO | WO 98/44477 | A1 | 10/1998 |
| WO | WO 99/04568 | A1 | 1/1999 |
| WO | WO 99/34564 | A1 | 7/1999 |
| WO | WO 00/34851 | A1 | 6/2000 |
| WO | WO 03/044684 | A1 | 5/2003 |
| WO | WO 03/045107 | A1 | 5/2003 |
| WO | WO 03/060804 | A1 | 7/2003 |
| WO | WO 03/100553 | A2 | 12/2003 |

OTHER PUBLICATIONS

Ciarcia, S., *The Best of Ciarcia's Circuit Cellar*, pp. 345-354 (1987).

Konstan, J. A., "State problems in programming human-controlled devices," *Digest of Tech. Papers of Int Conf. on Consumer Electronics* (*ICCE*) pp. 122-123 (1994).

Press Release: "Philipis Revolutionizes Home Theatre Control"; 1998, 3 pages.

"ProntoEdit User Manual"; 2002, http://www.pronto.philips.com/index.cfm?id=241, 85 pages.

"Pronto Review"; www.remotecentral.com/pronto/index.html, 3 pages.

Pronto link to downloadable files for components from different manufacturers; http://www.remotecentral.com/files/index.html, 3 pages.

Radio Shack, *Universal Remote Control Owners Manual*, pp. 1-19, (1987).

International Search Report for PCT/CA01/00323 mailed on Apr. 4, 2002; 7 pages.

CONFIGURATION METHOD FOR A REMOTE

This application is a continuation of and claims priority from U.S. patent application Ser. No. 13/103,902, filed May 9, 2011, which is a continuation of U.S. patent application Ser. No. 11/267,528, filed Nov. 3, 2005, which is a continuation of U.S. patent application Ser. No. 11/199,922, filed Aug. 8, 2005, now U.S. Pat. No. 7,436,319, which is a continuation of U.S. patent application Ser. No. 10/839,970, filed May 5, 2004, now U.S. Pat. No. 7,612,685, which is a continuation of U.S. patent application Ser. No. 09/804,623 filed Mar. 12, 2001, now abandoned, which claims the benefit of U.S. Provisional Patent Application No. 60/189,487, filed Mar. 15, 2000, all of which are incorporated herein by reference in their entirety for all purposes.

BACKGROUND OF THE INVENTION

1. Field of the Invention

The present invention relates generally to universal remote control devices and more specifically it relates to an online remote control configuration system for efficiently programming a remote control to control a plurality of external electronic devices.

2. Description of the Prior Art

Remote control devices have been in use for years. Remote control devices are utilized to operate various external electronic devices including but not limited to televisions, stereos, receivers, VCRs, DVD players, CD players, amplifiers, equalizers, tape players, cable units, lighting, window shades and other electronic devices. A conventional remote control is typically comprised of a housing structure, a keypad within the housing structure for entering commands by the user, electronic circuitry within the housing structure connected to the keypad, and a transmitter electrically connected to the electronic circuitry for transmitting a control signal to an electronic device to be operated.

The user depresses one or more buttons upon the keypad when a desired operation of a specific electronic device is desired. For example, if the user desires to turn the power off to a VCR, the user will depress the power button upon the remote control which transmits a "power off" control signal that is detected by the VCR resulting in the VCR turning off.

Because of the multiple electronic devices currently available within many homes and businesses today, a relatively new type of remote control is utilized to allow for the control of a plurality of electronic devices commonly referred to as a "universal remote control." Most universal remote controls have "selector buttons" that are associated with the specific electronic device to be controlled by the remote control (e.g. television, VCR; DVD player, etc.). Universal remote control devices allow for the control of a plurality of external electronic devices with a single remote control thereby eliminating the need to have a plurality of remote controls physically present within a room.

Conventional universal remote controls are typically programmed using two methods: (1) entering an "identifier code" directly into the remote control, or (2) sampling the control signal transmitted by another remote control device. Neither method of programming a universal remote control is efficient and causes many consumers to either not purchase a universal remote control or abandon the usage of an already purchased remote control.

Entering identifier codes into a remote control can be time consuming and difficult for many users. If the user loses the "code book" that comes with the universal remote control they are often times left with a useless universal remote control that they are unable to reprogram. Often times a consumer is given 4-8 different "possible" identifier codes for a particular brand of electronic device thereby requiring the user to, through trial and error, determine the correct identifier code. Sometimes an individual believes they have entered the proper identifier code since one or two of the commands on the keypad work only to find out later that one or more commands do not work with the electronic device since the proper identifier code was not entered.

Also, sampling of control signals is very time consuming and difficult to ensure proper sampling. An individual must expend significant amounts of time sampling infrared signals from another remote control and "saving" these signals within the universal remote control thereafter assigning the particular signal to a button on the keypad. This is very labor intensive and the results are only as stable as the infrared code sampled.

There are many problems with conventional universal remote controls. For example, many universal remote controls have a plurality of buttons wherein many are never utilized since the manufacturer attempts to have physical buttons for each possible command of each possible electronic device. Another problem conventional universal remote controls is that the electronic components within these devices is relatively complex and expensive to manufacture resulting in an increased cost to the consumer.

While these devices may be suitable for the particular purpose to which they address, they are not as suitable for efficiently programming a remote control to recognize a plurality of external electronic devices. Conventional universal remote control devices do not allow for easy and quick programming thereof. In addition, conventional universal remote controls are not always properly programmed thereby causing consumer dissatisfaction.

In these respects, the online remote control configuration system according to the present invention substantially departs from the conventional concepts and designs of the prior art, and in so doing, provides an apparatus primarily developed for the purpose of efficiently programming a remote control to recognize a plurality of external electronic devices.

BRIEF SUMMARY OF THE INVENTION

In view of the foregoing disadvantages inherent in the known types of universal remote controls now present in the prior art, the present invention provides a new online remote control configuration system construction wherein the same can be utilized for efficiently programming a remote control to recognize a plurality of external electronic devices.

The general purpose of the present invention, which will be described subsequently in greater detail, is to provide a new online remote control configuration system that has many of the advantages of the universal remote control devices mentioned heretofore and many novel features that result in a new online remote control configuration system which is not anticipated, rendered obvious, suggested, or even implied by any of the prior art remote controls, either alone or in any combination thereof.

To attain this, the present invention generally comprises a remote control having a housing, a keypad, and an electronic system for receiving configuration data from a control station via a global computer network (e.g. Internet). The user preferably "samples" one or more signals from a remote control into the electronic system and then uploads the samples to the control station. The control station analyzes the uploaded samples and transmits the appropriate configuration data to properly configure the electronic system. The user may also access a web site of the control station and manually select each of the external electronic devices that the remote control is to operate after which the control station sends the appropriate configuration data to the electronic system.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an online remote control configuration system that will overcome the shortcomings of the prior art devices.

A second object is to provide an online remote control configuration system for efficiently programming a remote control to recognize a plurality of external electronic devices.

Another object is to provide an online remote control configuration system that allows for a simple electronic configuration.

An additional object is to provide an online remote control configuration system that does not require a universal remote control to store hundreds of different signal codes that are never utilized.

A further object is to provide an online remote control configuration system that allows an individual to quickly configure a universal remote control.

A further object is to provide an online remote control configuration system that is able to upload a relatively complex configuration (e.g. "watch television") than is currently possible with current universals.

A further object is to provide an online remote control configuration system that allows customization of a remote control but for the specific system in which they are interconnected (e.g. so that they are effectively a system).

A further object is to provide an online remote control configuration system that can be configured to how the user desires to utilize electronic devices.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
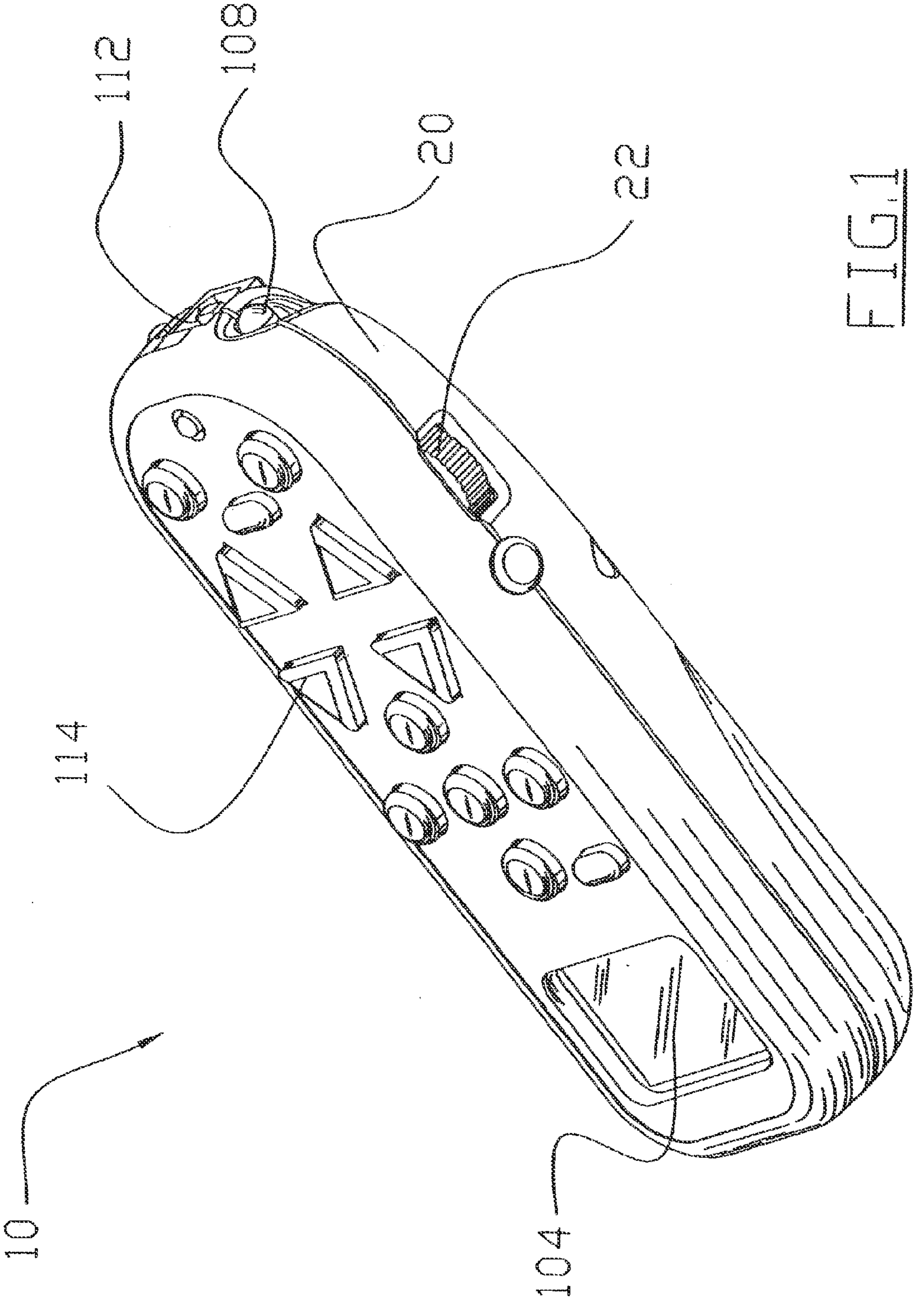
FIG. 1 is an upper perspective view of the present invention.
Figure 2:
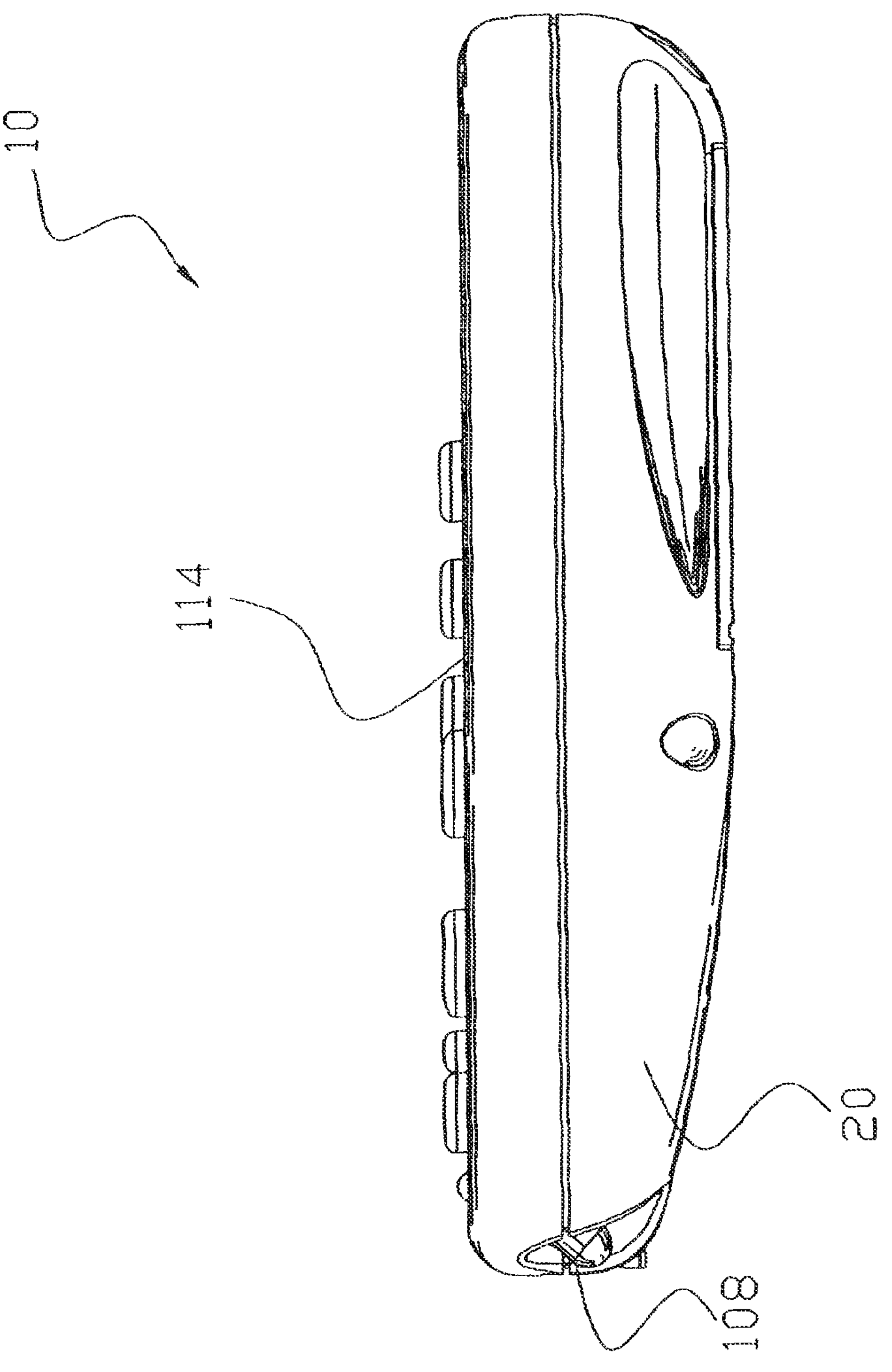
FIG. 2 is a side view of the present invention.
Figure 3:
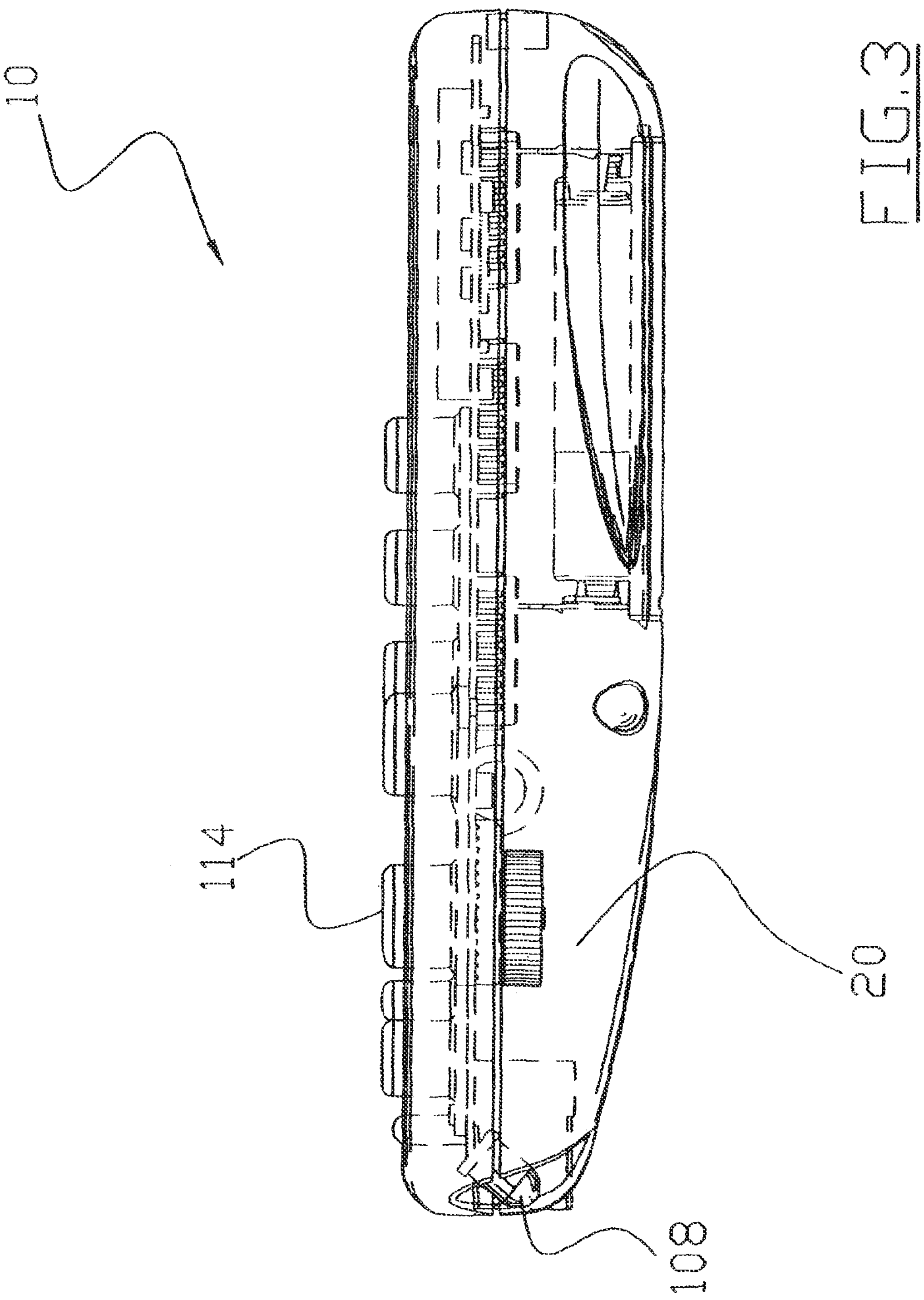
FIG. 3 is a side view of the present invention illustrating electronic circuitry within.
Figure 4:
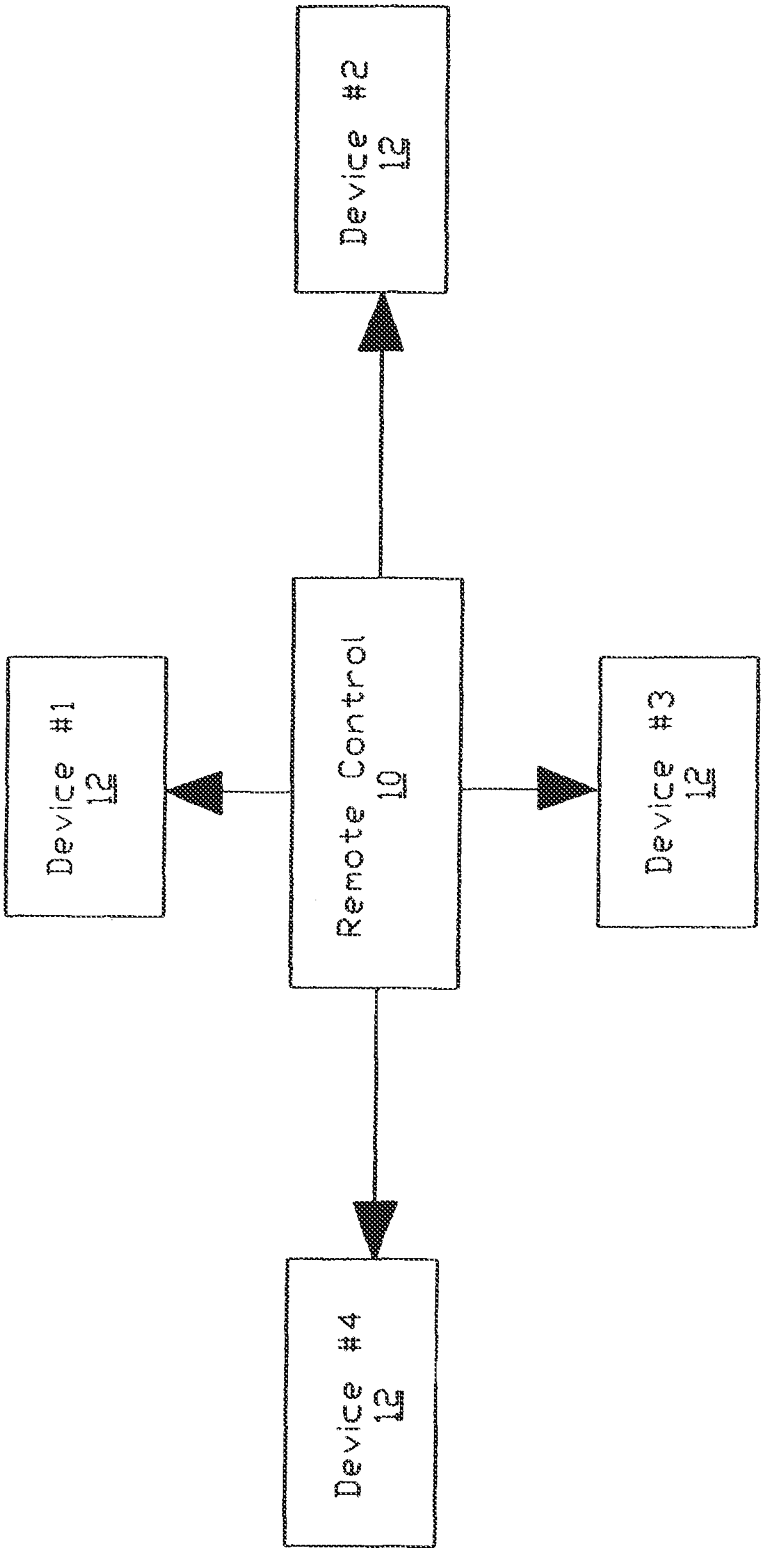
FIG. 4 is a block diagram illustrating the communications between the present invention and a plurality of external electronic devices.
Figure 5:
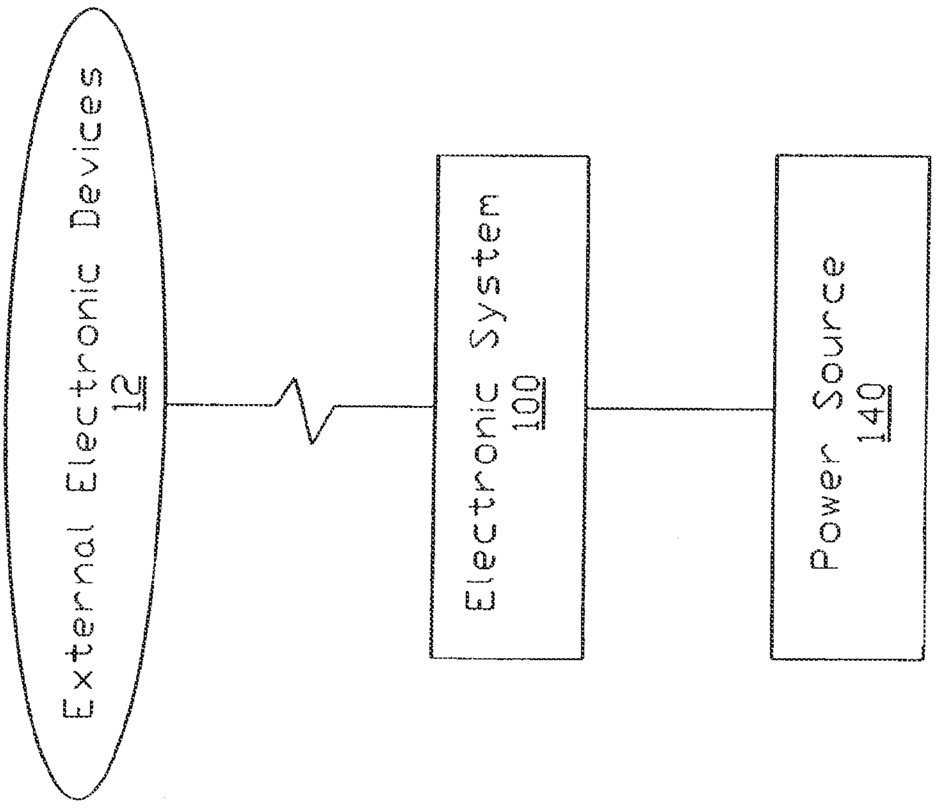
FIG. 5 is a block diagram illustrating the electronic system of the present invention electrically connected to the power source and in communication with the external electronic devices.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as but not limited to the Internet or wireless communications.

Turning now descriptively to the drawings, in which similar reference characters denote similar elements throughout the several views, FIGS. 1 through 16 illustrate an online remote control configuration system 10, which comprises a remote control having a housing, a keypad, and an electronic system for receiving configuration data from a control station via a global computer network (e.g. Internet). The user preferably "samples" one or more signals from a remote control into the electronic system and then uploads the samples to the control station. The control station analyzes the uploaded samples and transmits the appropriate configuration data to properly configure the electronic system. The user may also access a web site of the control station and manually select each of the external electronic devices that the remote control is to operate after which the control station sends the appropriate configuration data to the electronic system. The user can also specify how the devices are connected and the configuration can be transferred to the electronic system 100 from the control station 40.

A. Remote Control Structure

The present invention generally is comprised of a housing 20 having a structure and shape similar to conventional remote control devices. The housing 20 may be constructed of various types of materials and shapes as can be appreciated by one skilled in the art. The housing is preferably structured to be ergonomic for a majority of users.

The present invention may be utilized to control and operate various external electronic devices including but not limited to televisions, stereos, receivers, VCRs, DVD players, CD players, amplifiers, equalizers, tape players, cable units, satellite dish receivers, lighting, window shades and other electronic devices. Almost any number of external electronic devices may be controlled by the present invention as can be accomplished with conventional remote control devices.

Figure 6:
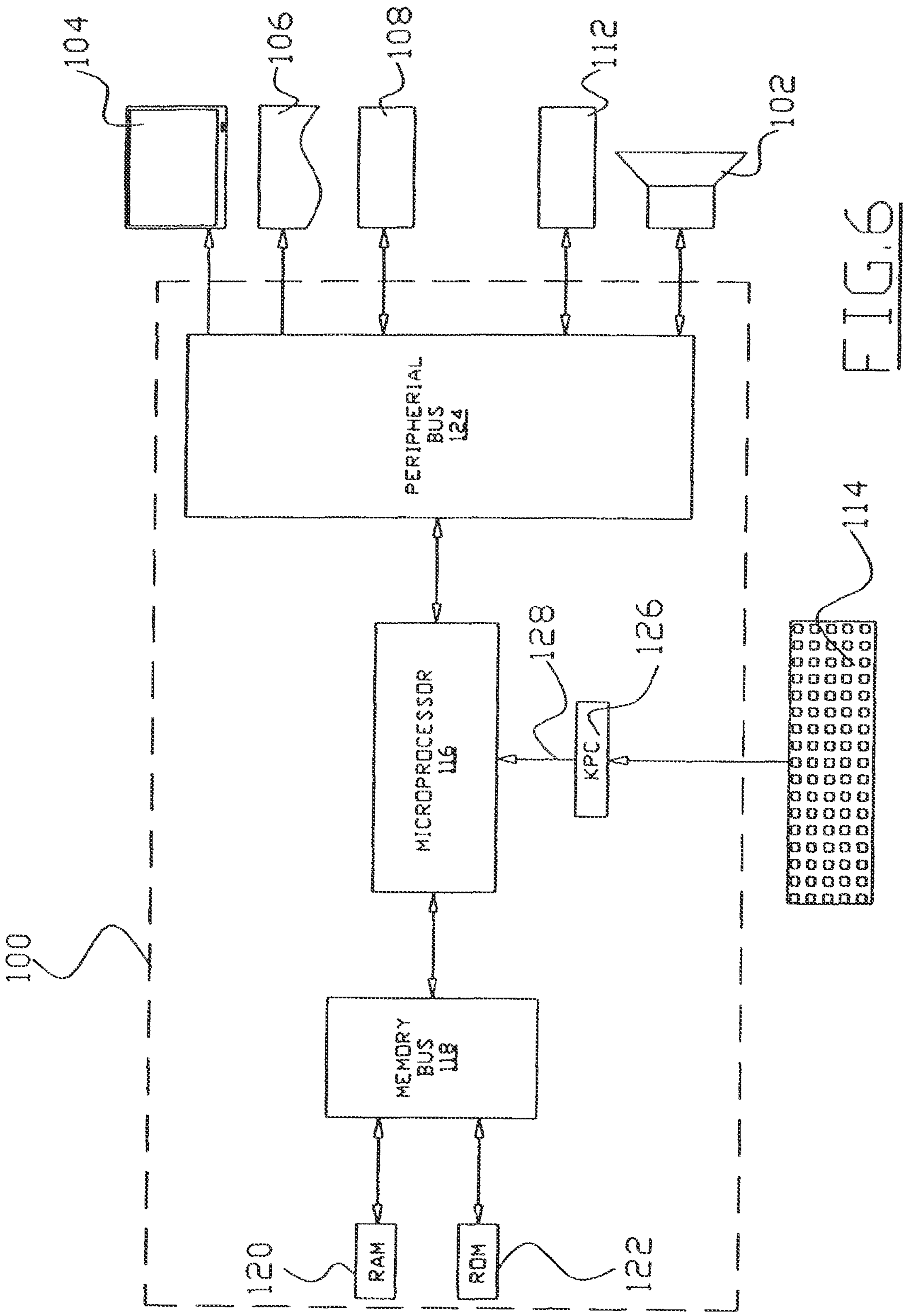
FIG. 6 is a block diagram illustrating the electronic system along with a plurality of accessory devices connected to thereof.

FIG. 6 is a block diagram of an exemplary electronic system 100 for practicing the various aspects of the present invention. The electronic system 100 is preferably enclosed within the housing. A portable power source 140 is electrically connected to the electronic system 100 for providing electrical power to the electronic system 100. The power source 140 may be comprised of any power source such as a battery structure (disposable or rechargeable), solar cells, or direct power.

The electronic system 100 preferably includes a display screen 104, a network interface 112, a keypad 114, a microprocessor 116, a memory bus 118, random access memory (RAM) 120, a speaker 102, read only memory (ROM) 122, a peripheral bus 124, a keypad controller 126, and a communications device 108. As can be appreciated, the electronic system 100 of the present invention may be comprised of any combination of well-known computer devices, personal digital assistants (PDAs), laptop computers, remote control devices and other electronic systems.

The microprocessor 116 is a general-purpose digital processor that controls the operation of the electronic system 100. Microprocessor 116 can be a single-chip processor or implemented with multiple components. Using instructions retrieved from memory, microprocessor 116 controls the reception and manipulations of input data and the output and display of data on output devices.

The memory bus 118 is utilized by microprocessor 116 to access RAM 120 and ROM 122. RAM 120 is used by microprocessor 116 as a general storage area and as scratch-pad memory, and can also be used to store input data and processed data. ROM 122 can be used to store instructions or program code followed by microprocessor 116 as well as other data.

Peripheral bus 124 is used to access the input, output and storage devices used by the electronic system 100. In the described embodiment(s), these devices include a display screen 104, an accessory device 106, a speaker 102, a communications device 108, and a network interface 112. A keypad controller 126 is used to receive input from the keypad 114 and send decoded symbols for each pressed key to microprocessor 116 over bus 128.

The display screen 104 is an output device that displays images of data provided by the microprocessor 116 via the peripheral bus 124 or provided by other components in the electronic system 100. Other output devices such as a printer, plotter, typesetter, etc. can be utilized as an accessory device 106.

The microprocessor 116 together with an operating system operate to execute computer code and produce and use data. The computer code and data may reside on RAM 120, ROM 122, or other storage mediums. The computer code and data could also reside on a removable program medium and loaded or installed onto the electronic system 100 when needed. Removable program mediums include, for example, PC-CARD, flash memory, and floppy disk.

Figure 7:
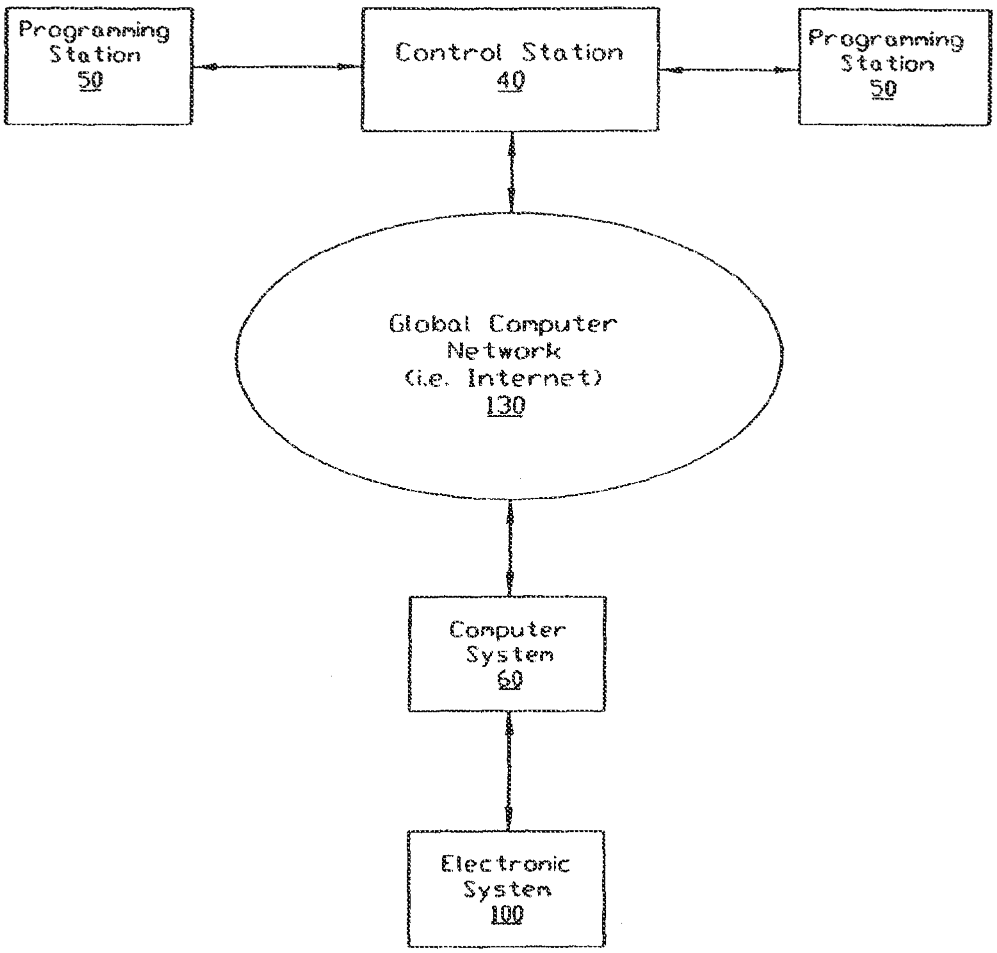
FIG. 7 is a block diagram of the present invention in communication with the control station via a global computer network wherein the electronic system is directly connected to an intermediary computer system.
Figure 8:
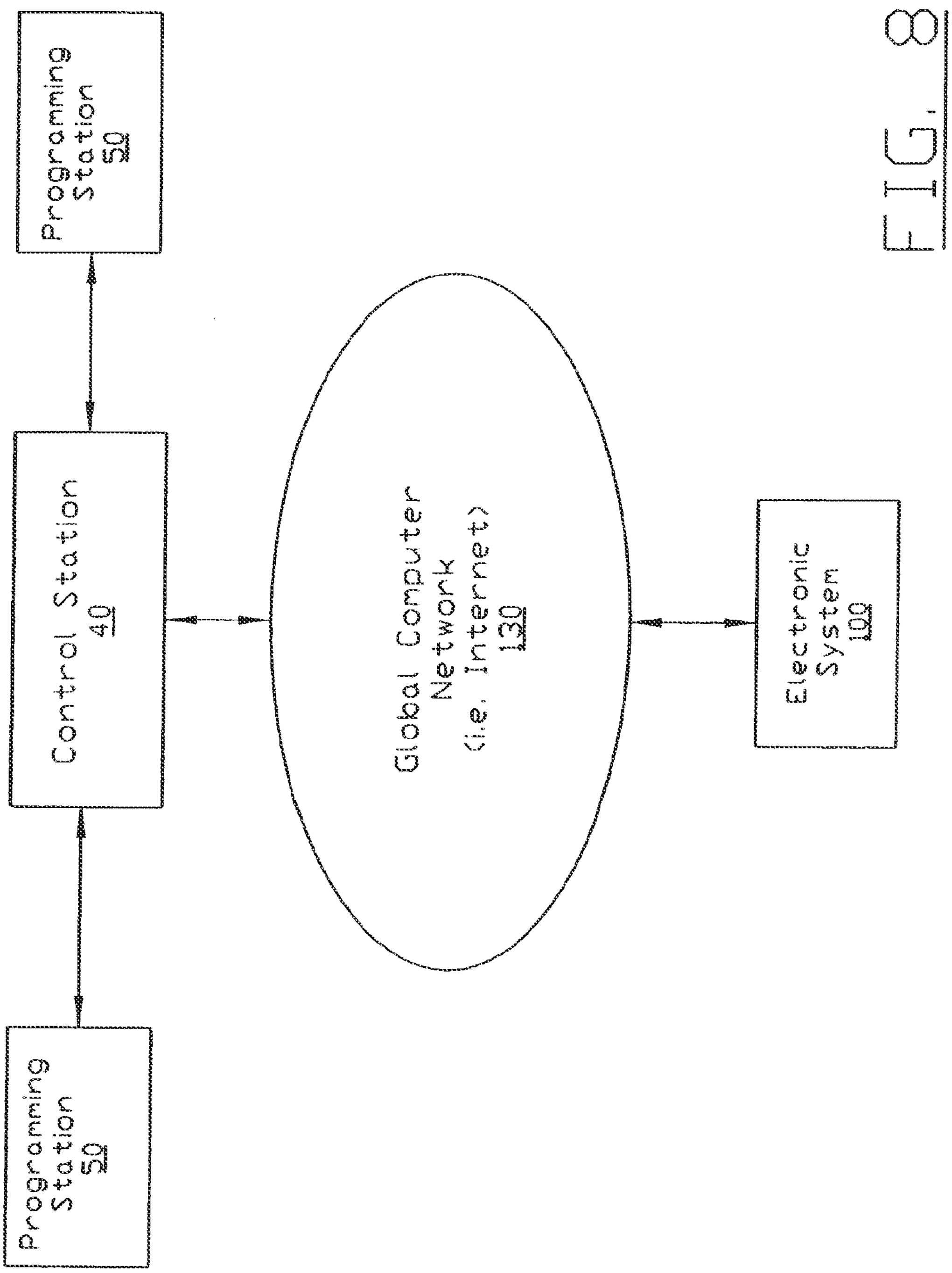
FIG. 8 is a block diagram of the present invention in communication with the control station directly via a global computer network without utilizing an intermediary computer system.

The network interface 112 is utilized to send and receive data over a network connected to other electronic systems. The network interface may also be comprised of a Universal Serial Bus (USB), an external bus standard that supports data transfer rates of 12 Mbps (12 million bits per second). A single USB port can be used to, connect up to 127 peripheral devices, such as mice, modems, and keyboards. An interface card or similar device and appropriate software implemented by microprocessor 116 can be utilized to connect the electronic system 100 to an existing network and transfer data according to standard protocols including data over a global computer network such as the Internet. The electronic system 100 may connect to the Internet 130 via a computer system 60 or directly as illustrated in FIGS. 7 and 8 respectively.

The keypad 114 is used by a user to input commands and other instructions to the electronic system 100. Other types of user input devices can also be used in conjunction with the present invention. For example, pointing devices such as a computer mouse, a jog switch 22, a track ball, a stylus, or a tablet to manipulate a pointer on a screen of the electronic system 100.

The present invention can also be embodied as computer readable code on a computer readable medium. The computer readable medium is any data storage device that can store data which can be thereafter be read by an electronic system. Examples of the computer readable medium include read-only memory, random-access memory, magnetic data storage devices such as diskettes, and optical data storage devices such as CD-ROMs.

The computer readable medium can also be distributed over a network coupled electronic systems so that the computer readable code is stored and executed in a distributed fashion.

The communications device 108 may be comprised of any well-known communication system that allows communications with external electronic devices. The communications device 108 may provide for various types of communication such as but not limited to via infrared (IR), wireless (e.g. BLUETOOTH), unidirectional, bi-directional, radio frequency (RF), visible light, ultrasonic and various other means for communicating with external electronic devices. The communications device 108 is capable of receiving a "signal sample" from another remote control wherein the signal sample is stored within the electronic system.

Input into the electronic system is accomplished mainly through the usage of the keypad 114. The keypad 114 includes a plurality of buttons that allow the user to execute one or more commands. The keypad 114 allows for the control of basic functions such as volume, channel manipulation, mute, and last channel. Various other input devices may be utilized to input data into the electronic system 100 such as a jog switch 22 (e.g. dial), motion and orientation detectors, touch sensitive screens and voice recognition. The display 104 provides information to the user such as possible tasks to complete or the current state of the external electronic devices.

B. Communication System

The present invention is best operated upon a global computer network such as the Internet 130. A plurality of computer systems around the world are in communication with one another via this global computer network.

The present invention preferably utilizes the Internet 130 for communications, however it can be appreciated that as future technologies are created that various aspects of the invention may be practiced with these improved technologies. In addition, wireless technologies provide a suitable communications medium for operating the present invention.

C. Web Page

The present invention is preferably utilized in conjunction with information presented upon a web page or other displayable medium representing the control station 40. A web page is typically comprised of a web page code that is stored upon a computer server. A typical web page includes textual, graphical and audio data within for display upon a computer system 60 and may be comprised of various formats.

The web page code may be formatted such as but not limited to HTML (Hyper-Text Markup Language), XML (Extensible Markup Language), HDML (Handheld Device Markup Language), and WML (Wireless Markup Language) that is displayable upon a computer system. Scripts such as JavaScript may be included within the web page code to request the server computer to request a specific audio file to be played with respect to an advertisement. As can be appreciated, additional formats for the web page code may be utilized as developed.

The web page code is retrieved by a computer system 60 or electronic system 100 via the Internet, wireless network or other communications channel utilizing a conventional web browser such as but not limited to NETSCAPE or MICROSOFT INTERNET EXPLORER. An individual using the computer system 60 enters the URL (Uniform Resource Locator) identifying the web page to retrieve the web page code associated with the desired web page.

Figure 12:
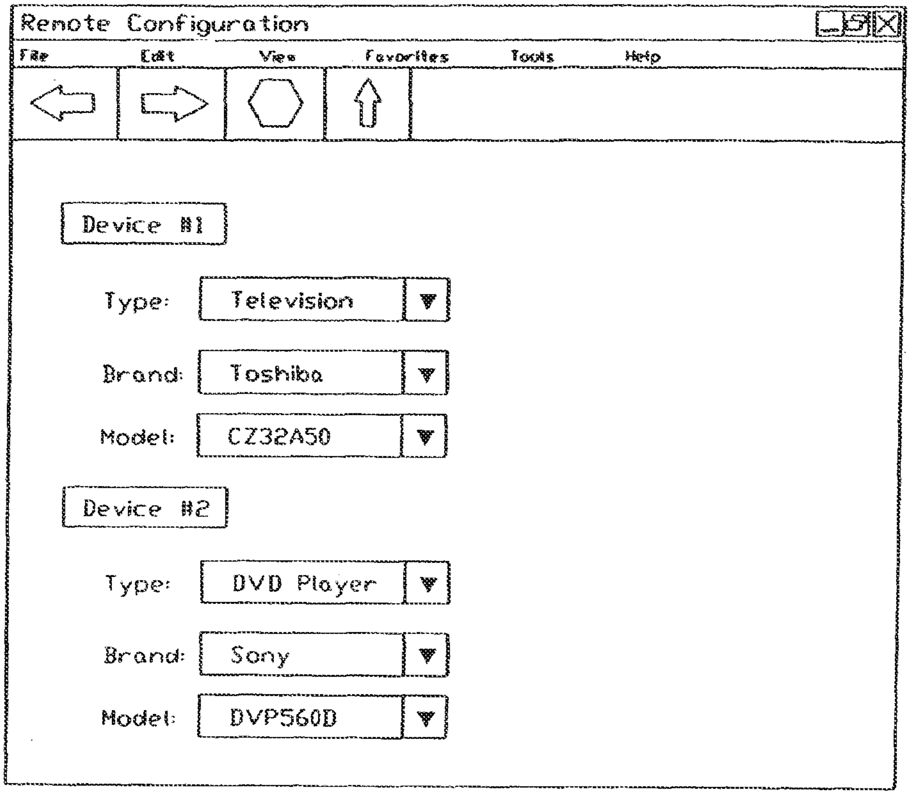
FIG. 12 is an illustration of a web page for entering electronic device information into.
Figure 13:
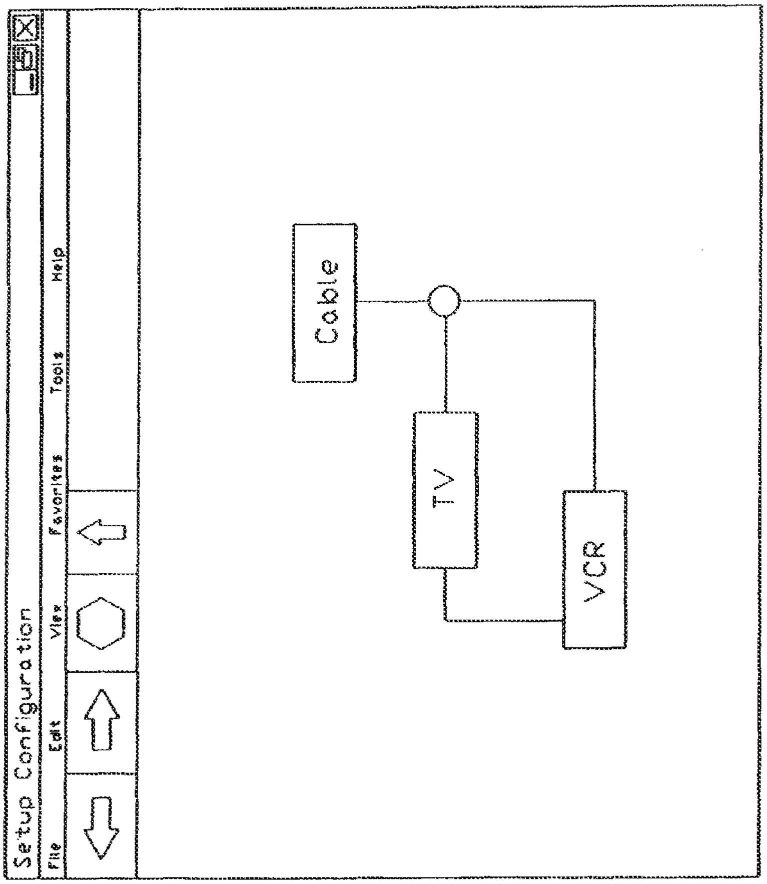
FIG. 13 is an illustration of a web page displaying the connection of external electronic devices.
Figure 14:
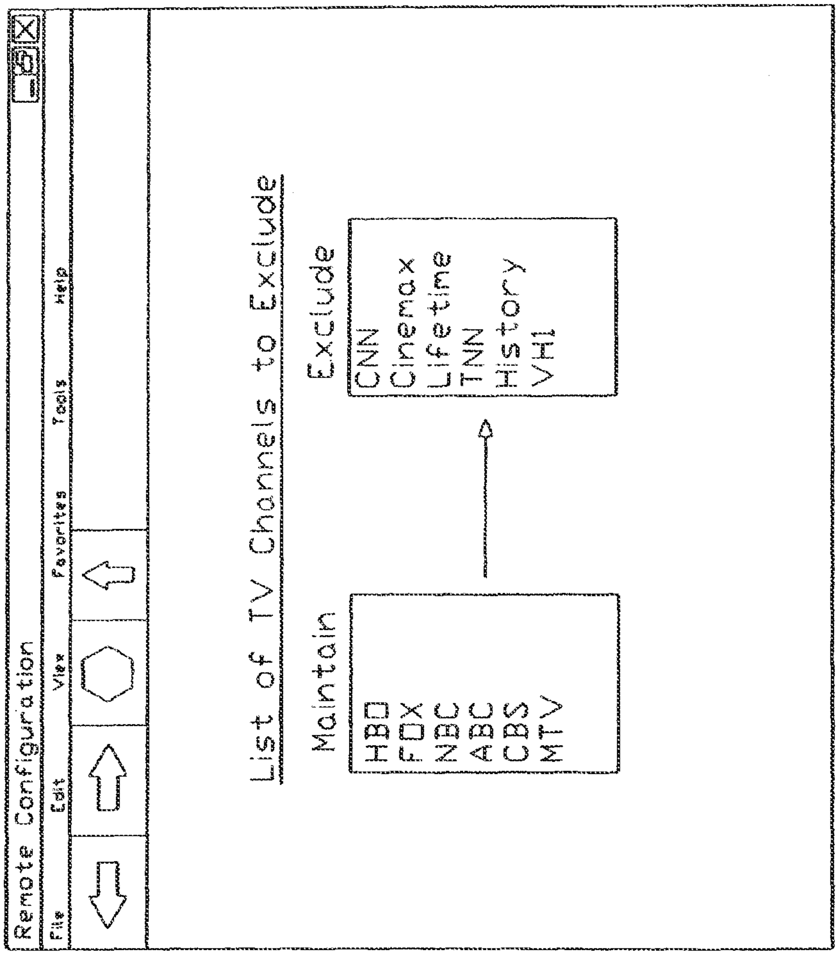
FIG. 14 is an illustration of a web page displaying the selection of channels to include and exclude from the electronic system configuration.
Figure 15:
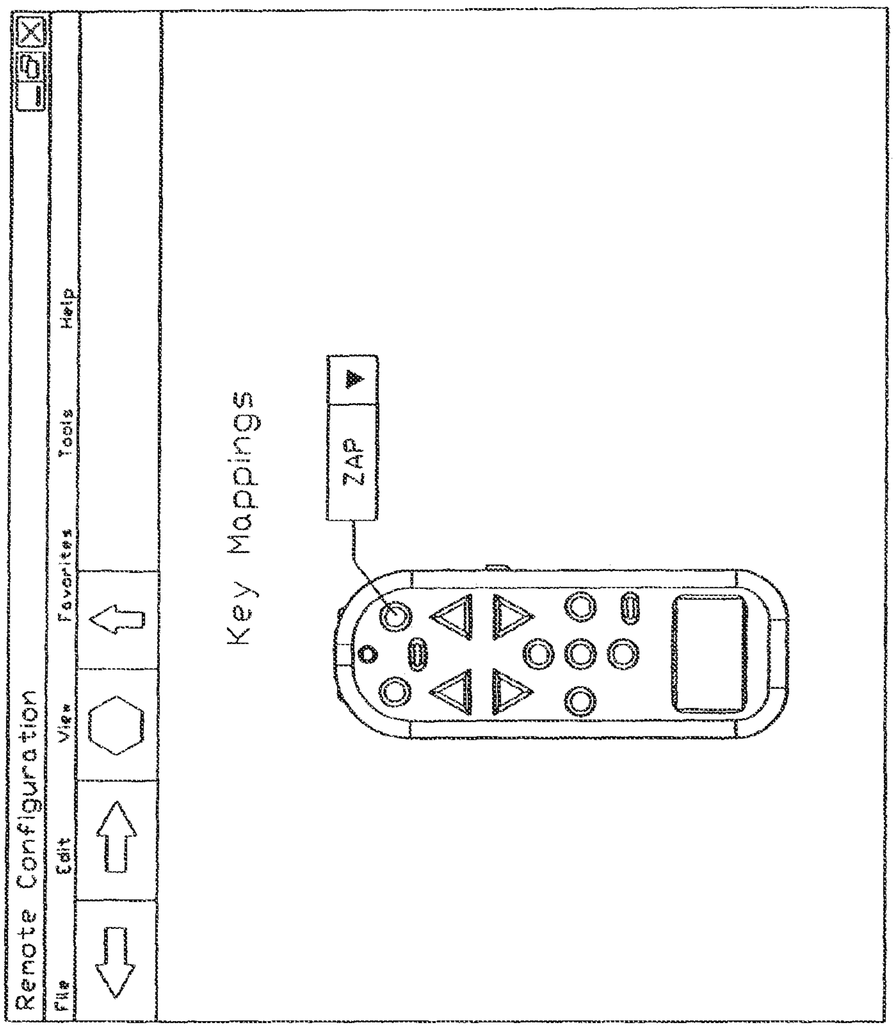
FIG. 15 is an illustration of a web page showing the key mappings upon the keypad as configured.
Figure 16:
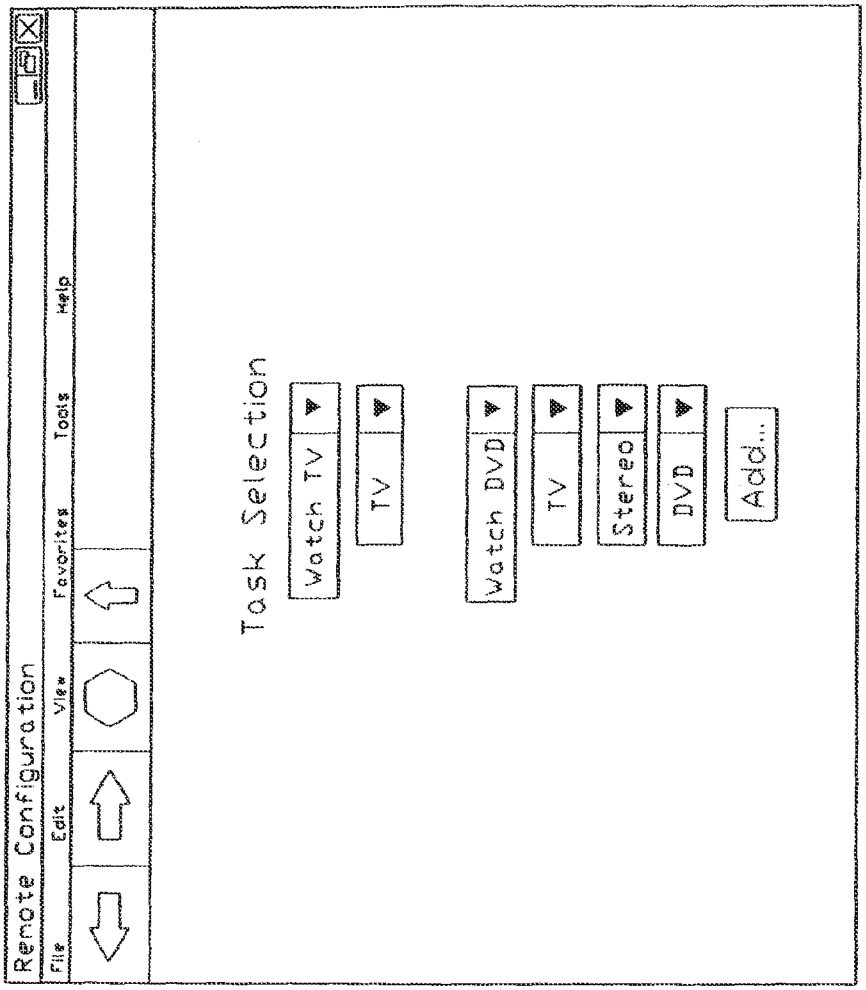
FIG. 16 is an illustration of a web page showing the setup of various tasks such as "Watch Television" and "Watch DVD."

As shown in FIG. 12 of the drawings, at least one of the web pages associated with the control station 40 allows for the direct entry of the device identification. More particularly, information relating to the type, brand and model of the device are preferably entered into the web page that are thereafter forwarded to the control station 40 for determination of the configuration data. Various other designs of web pages may be utilized to receive the device data as can be appreciated by one skilled in the art. FIG. 13 discloses a direct entry of the device connections. The device connections can be specified/represented graphically, through dropdown lists or other configurations.

D. Control Station

The control station 40 is in communication with the Internet 130 via various well-known means. The control station 40 is preferably accessed by users via a web page which allows the users to identify themselves and modify user settings. The user may input various conditions and requirements regarding the external electronic devices 12 that the remote control is to control. The user settings may be modified at anytime via the web page or other means.

The control station 40 is in communication with one or more programming stations 50 that provide updated electronic device information to the control station 40. The electronic device information is basically comprised of product information, type, brand, model, year, communication type, and signal configuration data. It can be appreciated that additional types of electronic device information may be received and stored by the control station 40.

The control station 40 maintains a database that allows for the determination of an electronic device by one or more signal samples from the corresponding remote control. The control station maintains a database that allows for the determination of what inputs and outputs are on the electronic devices 12, and the mechanism for transferring between states. The control station 40 is preferably updated at periodic intervals regarding updated information regarding new electronic devices on the market.

E. Sampling Mode

The preferred method of operating the present invention is to "sample" the signal emitted from a remote control corresponding to the electronic device, 12 to be controlled. Prior to sampling the signal, the user may select a "sample button" which will place the electronic system in "sample mode" for receiving one or more sample signals per remote control. Signal sampling has been performed within the remote control industry for years and is well known to those skilled in the art particularly with infrared signal sampling. No further discussion of signal sampling is required as the same is readily apparent in the art.

Prior to sampling the signal, the user positions the communication device 108 of the electronic system 100 in a location to detect and receive the signal from the remote control. Though not required, the user typically will select a button on the keypad 114 identifying the button they plan to press on the remote control prior to depressing. For example, if the user is going to sample the "power on/off signal" from the remote control, the user would select the "power button" or other appropriate button on the keypad 114 during sampling mode.

Figure 9:
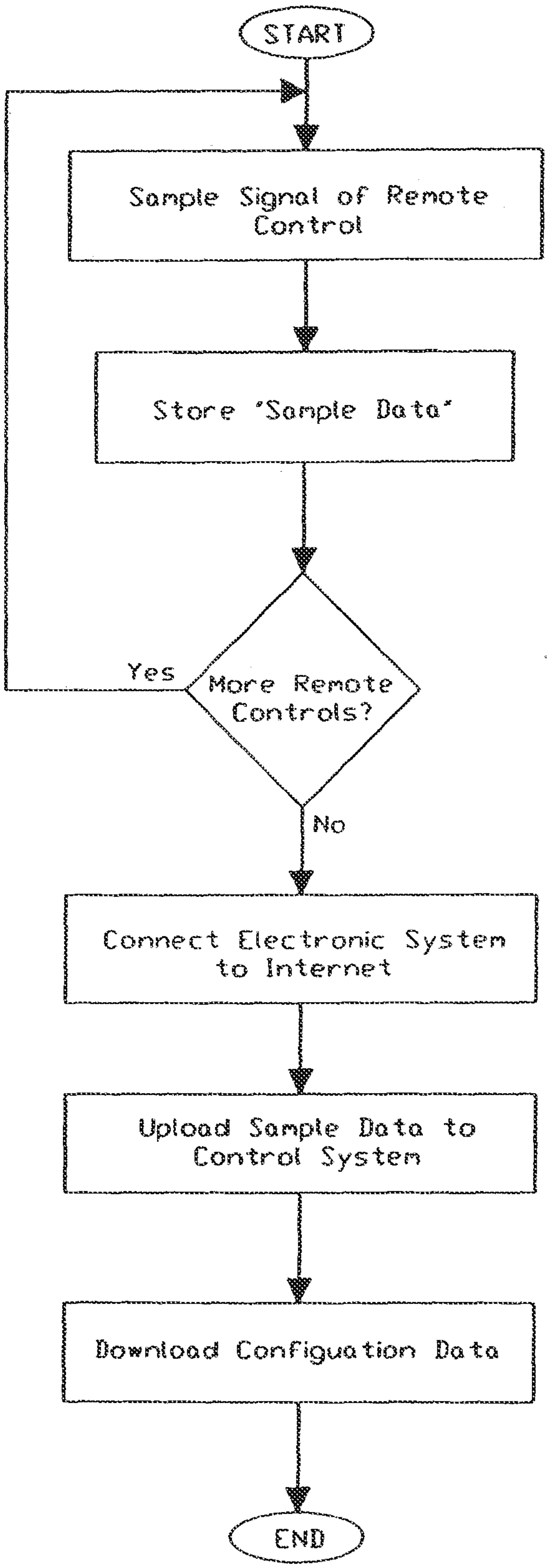
FIG. 9 is a flowchart illustrating the overall operation of the present invention from sampling the signal code of each remote control to downloading the configuration data.

After identifying to the electronic system 100 what button on the remote control will, be depressed, the user then depresses the desired button on the remote control thereby transmitting the signal to the communication device 108 which receives the signal as shown in FIG. 9 of the drawings. The signal is then converted and forwarded by the communication device 108 to the memory 120 of the electronic system 100 for storage. It can be appreciated that if the electronic system 100 is connected to the global computer network 130 that the sample signals do not need to be stored within the electronic system 100. Additional samples may be taken from the remote control or another remote control may be sampled.

F. Uploading Sampled Signals

Figure 10:
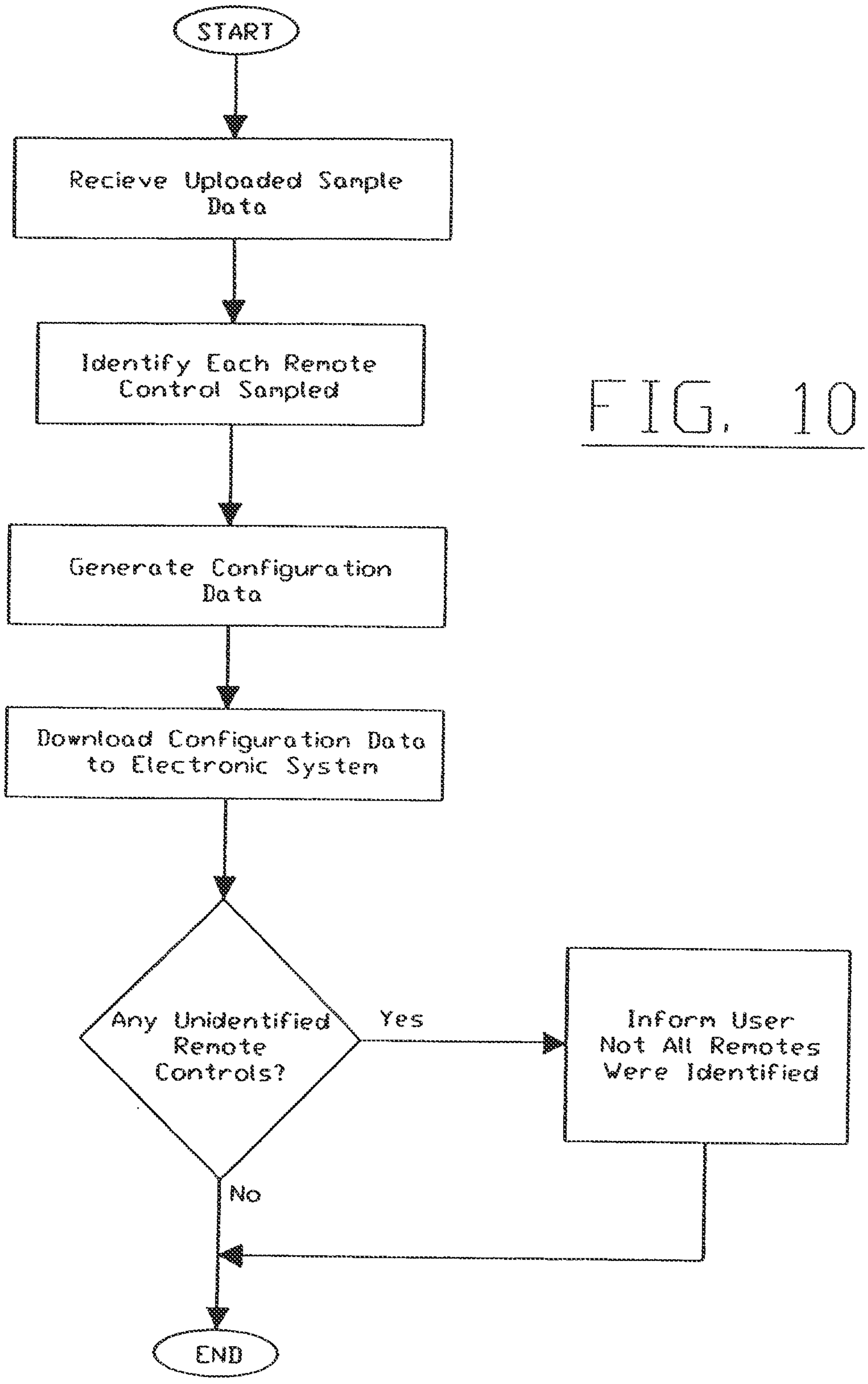
FIG. 10 is a flowchart illustrating the functionality within the control station for identifying each electronic device.

As shown in FIGS. 9 and 10 of the drawings, after the desired signals have been sampled the user connects the electronic system 100 to the Internet via the network interface 112, the communication device 108 or other means. The electronic system 100 may be directly or indirectly connected to the Internet as shown in the figures. The user then uploads the "sample data" to the control station 40.

As shown in FIG. 10 of the drawings, the control station 40 analyzes the sample data to determine the type, brand and model of each of the electronic devices 12 that are controlled by the corresponding sampled signal. Once the control station 40 has determined what the type, brand and model of each of the electronic devices 12 is, the control station 40 then generates "configuration data" that is then downloaded to the electronic system 100. The configuration data configures the electronic system so that it is able to control all of the external electronic devices 12 as a universal remote control would. The user then utilizes the programmed remote control similar to a universal remote control. It is noted that the control system may prompt the user for additional information that may be utilized to create a personalized configuration.

G. Direct Configuration

Figure 11:
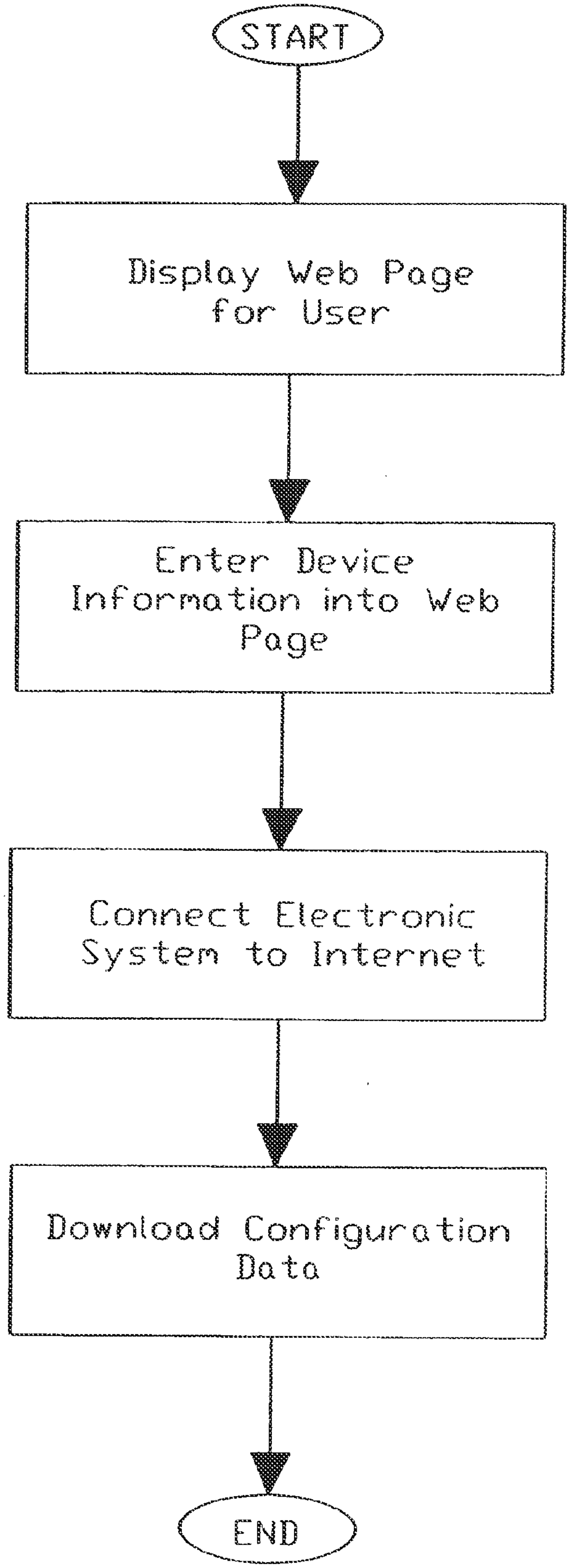
FIG. 11 is a flowchart illustrating the usage of a web page to allow a user to directly enter the identity of each electronic device into the control station.

As shown in FIGS. 11 and 12 of the drawings, the user may avoid sampling the signal from each of the remote controls and instead directly enter product information into the web page of the control station 40. The user preferably enters relevant product information such as but not limited to device type (e.g. VCR, television, DVD player, etc.), brand (e.g. SONY, TOSHIBA, etc.), model, device physical appearance, and remote control physical appearance. Showing, for user selection, pictures, such as pictures of devices or device remote controls. The relevant product information may be entered in response to one or more prompts presented to the user, and the prompts may be iteratively presented to provide the narrowing down of appliances that match the user's appliance.

Once the all of the device information has been entered for each of the electronic devices 12, the user then connects the electronic system 100 to the Internet via the network interface 112, the communication device 108 or other means. The electronic system 100 may be directly or indirectly connected to the Internet as shown in the figures.

Once the control station 40 has determined what the type, brand and model of each of the electronic devices 12 is, the control station 40 then generates "configuration data" that is then downloaded to the electronic system 100. The configuration data configures the electronic system so that it is able to control all of the external electronic devices 12 as a universal remote control would. The user then utilizes the programmed remote control similar to a universal remote control.

As electronic devices are added to or removed from the. user's electronic system, they can update their device information at the control station 40 via the usage of an uploaded signal sample or directly through the web page. The user is able to utilize the remote control as a conventional remote for all of their electronic devices 12 without interruption.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, .the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method for controlling appliances, comprising:

receiving, from an electronic system that is capable of communicating with at least one of a plurality of user-controlled appliances, information encoding physical appearance information for a user-controlled appliance among the plurality of user-controlled appliances;

determining, based at least on the received information, a set of command codes for the corresponding user-controlled appliance, the set of command codes being effective to control the user-controlled appliance when implemented by the electronic system; and configuring the electronic system with the determined set of command codes to control the corresponding user-controlled appliance, wherein the information encoding the physical appearance information for the user-controlled appliance corresponds to an image representing the physical appearance of the user-controlled appliance.

2. The method of claim 1, wherein the information encoding the physical appearance information for the user-controlled appliance is received from a user.

3. The method of claim 2, wherein the information encoding the physical appearance information for the user-controlled appliance is received from a user in response to one or more prompts presented to the user.

4. The method of claim 1, wherein the set of command codes is determined by a control station that is remote from the electronic system.

5. The method of claim 4, wherein the control station is connected to the electronic system over a global computer network.

6. The method of claim 1, wherein receiving the information encoding the physical appearance information for the user-controlled appliance includes receiving a selection by the user of a picture of the physical appearance of the user-controlled appliance.

7. The method of claim 1, wherein receiving the information encoding the physical appearance information for the user-controlled appliance includes receiving a selection by the user of a picture of a remote control for the user-controlled appliance.

8. The method of claim 1, further comprising receiving, from the electronic system, information encoding connection information for the plurality of user-controlled appliances.

9. A system for controlling appliances, comprising:

one or more processors; and memory, including instructions executable by the one or more processors to cause the system to at least:

receive information that corresponds to a physical appearance of at least one user-controlled appliance with which the system is capable of communicating;

determine, by at least analyzing the received information, a set of command codes that, when implemented by a remote control device, are effective to control the corresponding user-controlled appliance; and transmit, to the remote control device, the determined command codes to control the corresponding user-controlled appliance.

10. The system of claim 9, wherein the information that corresponds to the physical appearance of the at least one user-controlled appliance is received from a user associated with the system.

11. The system of claim 9, wherein the information that corresponds to the physical appearance of the at least one user-controlled appliance identifies an image of the physical appearance of the at least one user-controlled appliance.

12. The system of claim 9, wherein the information that corresponds to the physical appearance of the at least one user-controlled appliance identifies an image of the physical appearance of the at least one user-controlled appliance selected by a user of the remote control device.

13. The system of claim 9, wherein the received information is analyzed to determine whether it corresponds with at least one user-controlled appliance with which the system is capable of communicating.

14. The system of claim 9, wherein the system is capable of communicating with the user-controlled appliance using the remote control device.

15. The system of claim 9, wherein the remote control device is capable of implementing the determined command codes to control the corresponding user-controlled appliance.

16. The system of claim 9, wherein the system is included in a mobile communications device.

17. The system of claim 9, further comprising instructions for receiving, from the electronic system, information encoding connection information of the at least one user-controlled appliance to one or more other user-controlled appliances.

18. One or more computer-readable storage media having collectively stored thereon executable instructions that, when executed by one or more processors of a computer system, cause the computer system to at least:

receive information that corresponds to physical appearances of user-controlled appliances able to receive communications from devices associated with the computer system;

determine, based at least on analyzing the received information, the user-controlled appliances corresponding to the received information;

determine command code sets for at least a subset of the user-controlled appliances, the command code sets enabling control of the corresponding user-controlled appliances when implemented by the devices; and implementing, by the devices, the determined command code sets.

19. The computer-readable storage media of claim 18, wherein the information that corresponds to physical appearances of user-controlled appliances is received from a user associated with the devices associated with the computer system.

20. The computer-readable storage media of claim 18, wherein the determined command code sets are implemented by transferring the determined command code sets to the devices.

21. The computer-readable storage media of claim 18, wherein the information corresponding to at least one particular user-controlled appliance corresponds to an image selected by a user of the particular user-controlled appliance.

22. The computer-readable storage media of claim 18, wherein the executable instructions further cause the computer system to provide a user-exposed interface to a user via a public communications network, wherein the user-exposed interface enables the user to provide the information.

23. The computer-readable storage media of claim 18, wherein the devices are remote control devices.

24. The computer-readable storage media of claim 18, wherein the executable instructions further cause the computer system to maintain a data store that includes command code sets for a plurality of user-controlled appliances.

25. The computer-readable storage media of claim 24, wherein the executable instructions further cause the computer system to determine the command code sets by querying the data store for the command code sets associated with the determined user-controlled appliances.

26. The computer-readable storage media of claim 18, wherein the information corresponding to the physical appearances of the user-controlled appliances is based at least in part on images identified by at least some users of the devices associated with the computer system.

27. The computer-readable storage media of claim 26, wherein the images include images of at least some of the physical appearances of the user-controlled appliances.

28. The computer-readable storage media of claim 26, wherein the images include images of remote controls for at least some of the user-controlled appliances.

* * * * *